(12) United States Patent
Sumi

(10) Patent No.: US 7,630,035 B2
(45) Date of Patent: Dec. 8, 2009

(54) REFLECTIVE STRUCTURE AND AN IMAGE DISPLAY DEVICE HAVING FIRST, SECOND AND THIRD FUNDAMENTAL SURFACES FORMED ON A SUPPORTING MEMBER AND HAVING DIFFERING HEIGHT PORTIONS

(76) Inventor: Naoki Sumi, 1-9-3-8-504, Ryugadai, Suma-ku, Kobe-shi, Hyogo (JP)

( * ) Notice: Subject to any disclaimer, the term of this patent is extended or adjusted under 35 U.S.C. 154(b) by 520 days.

(21) Appl. No.: 10/596,844

(22) PCT Filed: Dec. 24, 2004

(86) PCT No.: PCT/IB2004/052920
§ 371 (c)(1),
(2), (4) Date: Jun. 27, 2006

(87) PCT Pub. No.: WO2005/069065
PCT Pub. Date: Jul. 28, 2005

(65) Prior Publication Data
US 2007/0146577 A1    Jun. 28, 2007

(30) Foreign Application Priority Data
Jan. 5, 2004    (WO) ................ PCT/IB2004/000067

(51) Int. Cl.
*G02F 1/1335*    (2006.01)

(52) U.S. Cl. ..................................... 349/113
(58) Field of Classification Search ................. 349/113, 349/114
See application file for complete search history.

(56) References Cited

U.S. PATENT DOCUMENTS

| | | | |
|---|---|---|---|
| 7,321,407 B2 * | 1/2008 | Yoshii | 349/113 |
| 7,480,019 B2 * | 1/2009 | Itami et al. | 349/113 |
| 2001/0035927 A1 * | 11/2001 | Sasagawa et al. | 349/113 |

FOREIGN PATENT DOCUMENTS

WO    WO-03/046650 A1    6/2003

* cited by examiner

*Primary Examiner*—John Heyman
(74) *Attorney, Agent, or Firm*—Birch, Stewart, Kolasch & Birch, LLP

(57) ABSTRACT

A reflective electrode substrate (1) comprises a supporting member having a plurality of first fundamental surfaces (Sf) each having portions (K1, K2) differing in their height, a plurality of undulating portions (18 to 128) formed on the supporting member arranged in the x direction at a undulating portion pitch (Tx) and a plurality of reflective electrodes (Er1, ..., Eg6). The plurality of fundamental surfaces (Sf) are arranged in the x direction at the pixel pitch (Sx) and the undulating portion pitch (Tx) is a non-integral multiple of the pixel pitch (Sx).

20 Claims, 17 Drawing Sheets

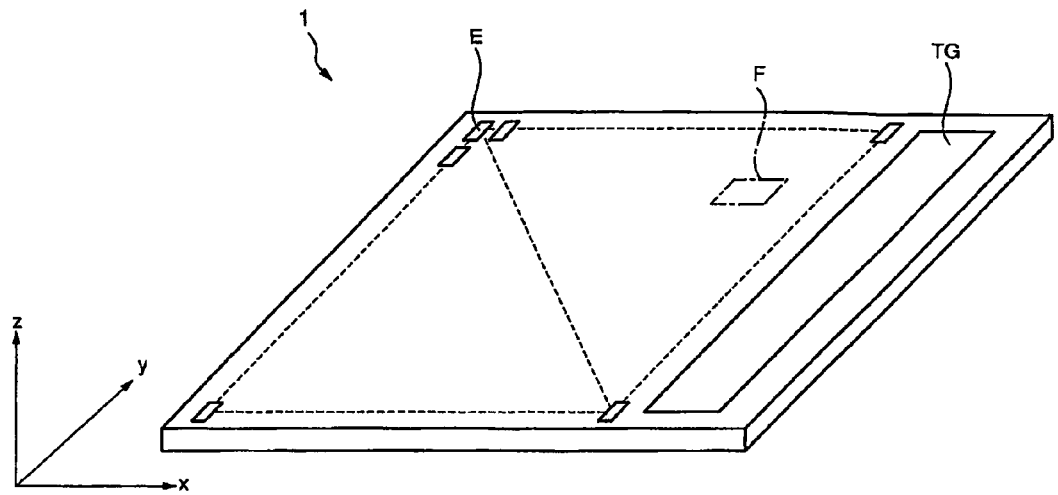
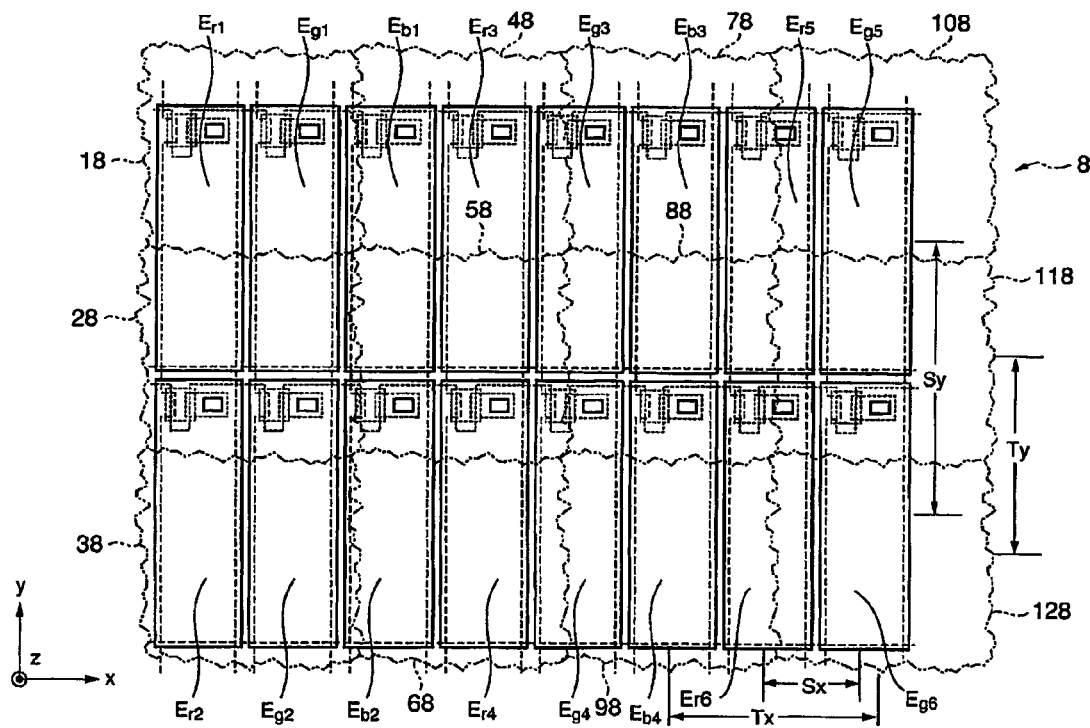

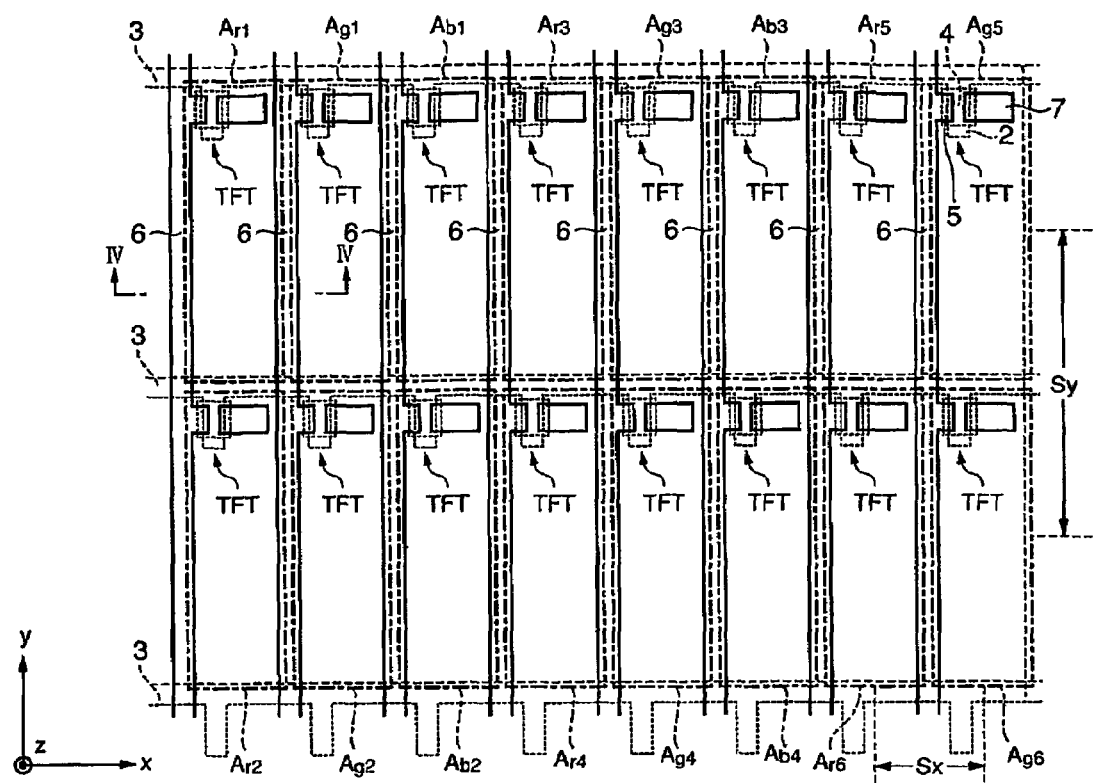
[Fig. 3]
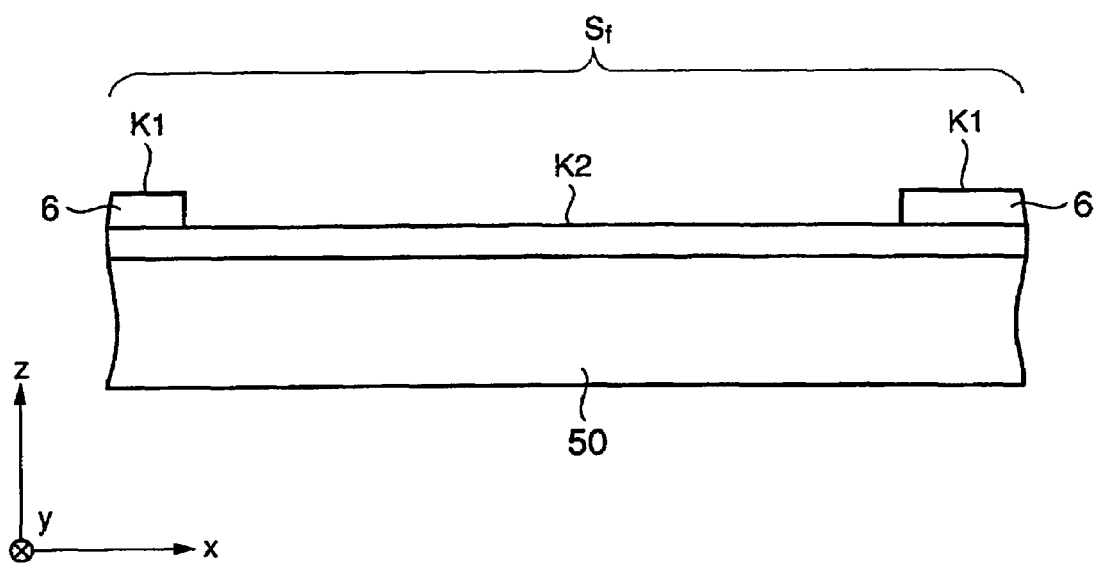
[Fig. 4]

[Fig. 5]
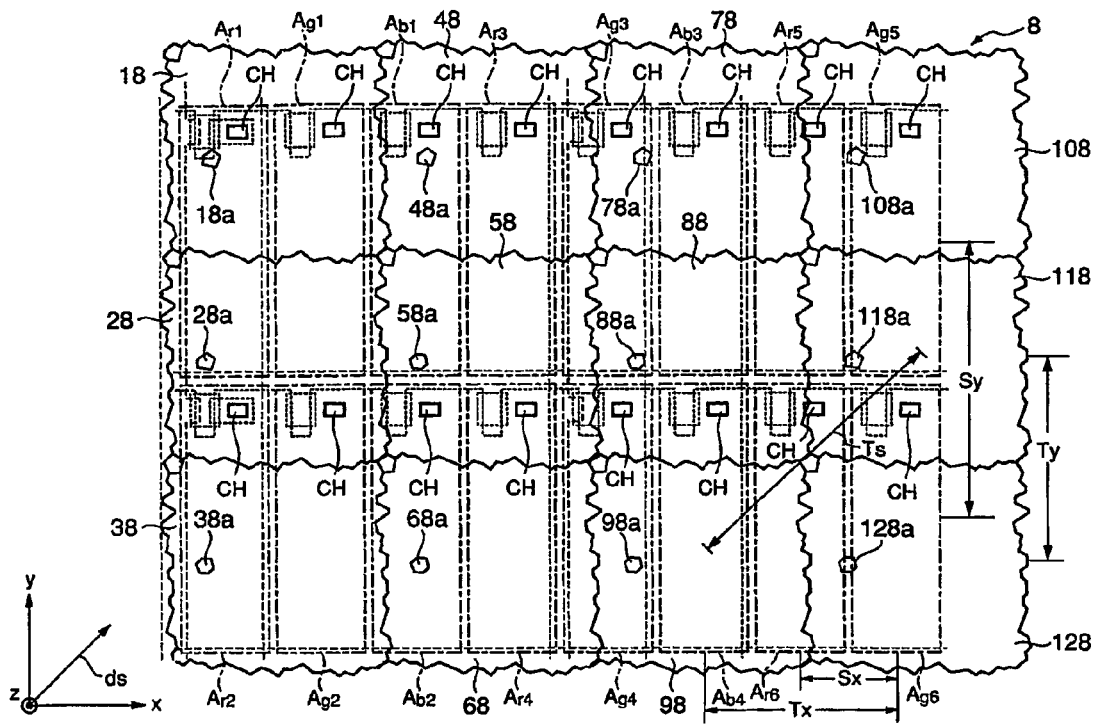
[Fig. 6]
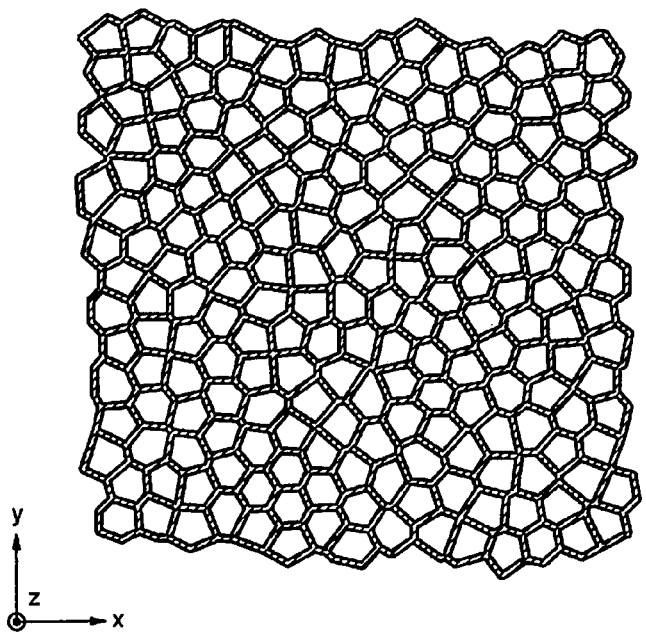

[Fig. 7]
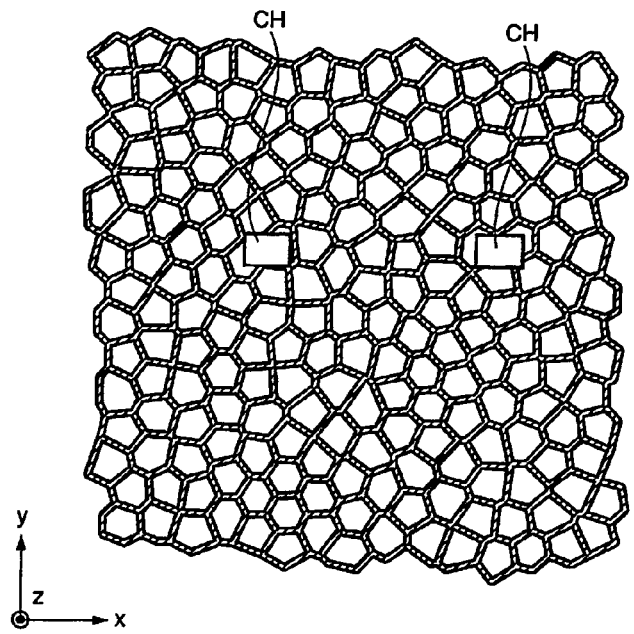
[Fig. 8]
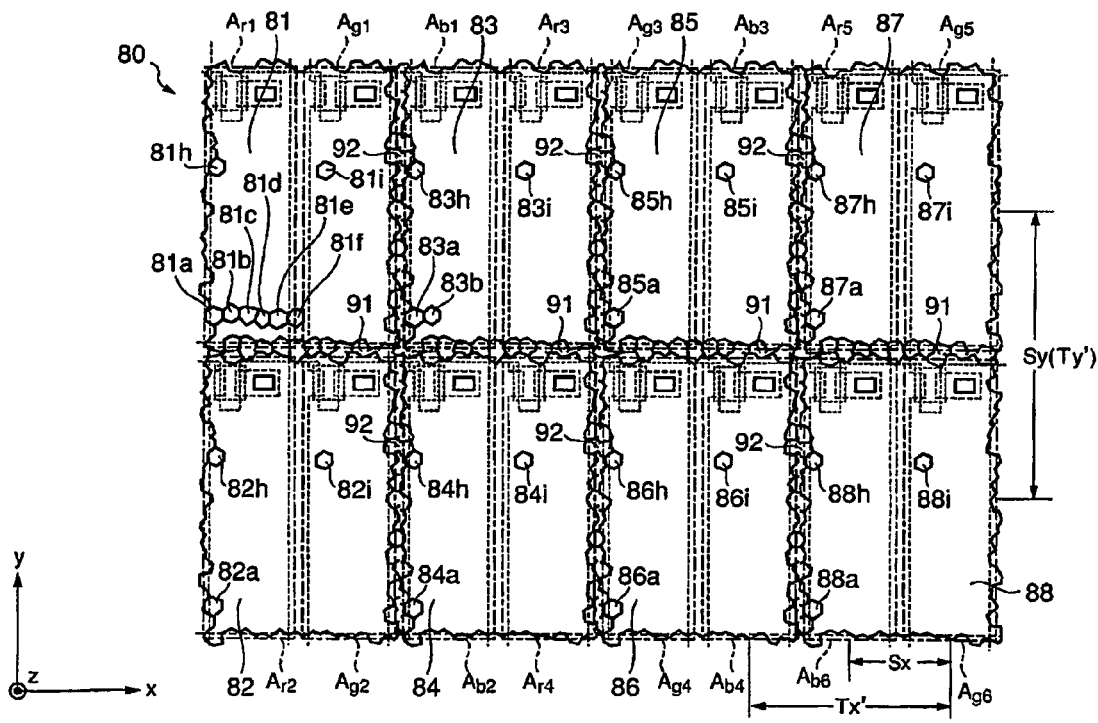

[Fig. 9]
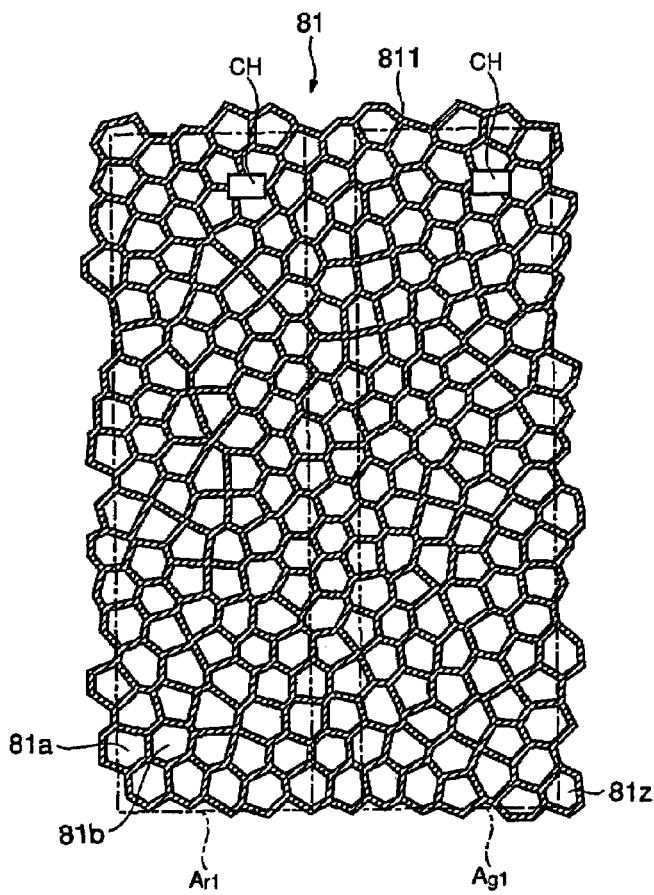
[Fig. 10]
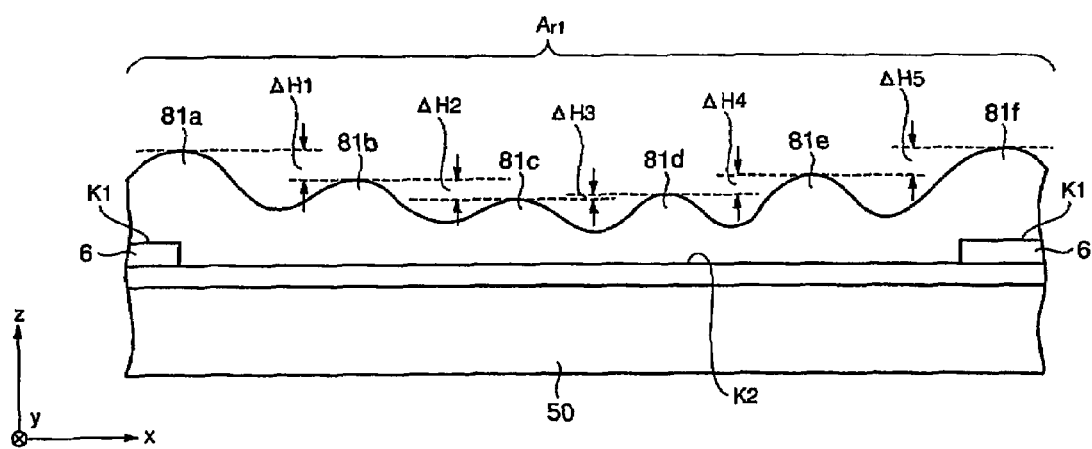

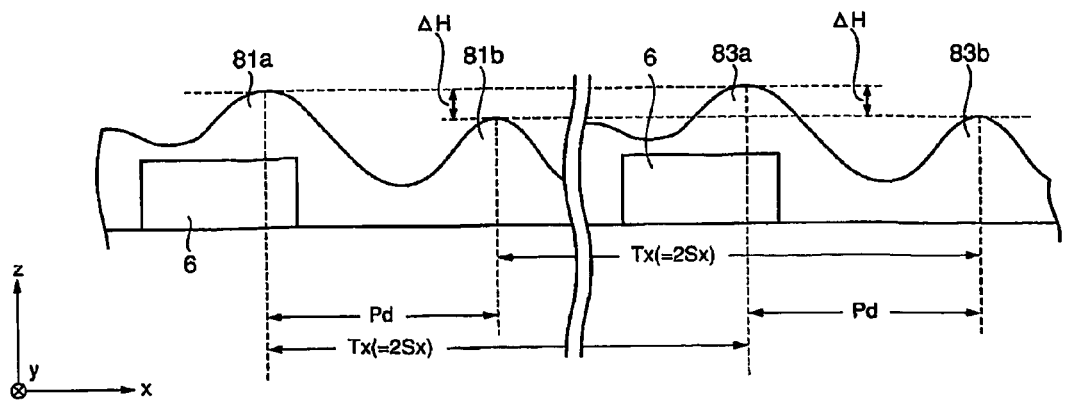
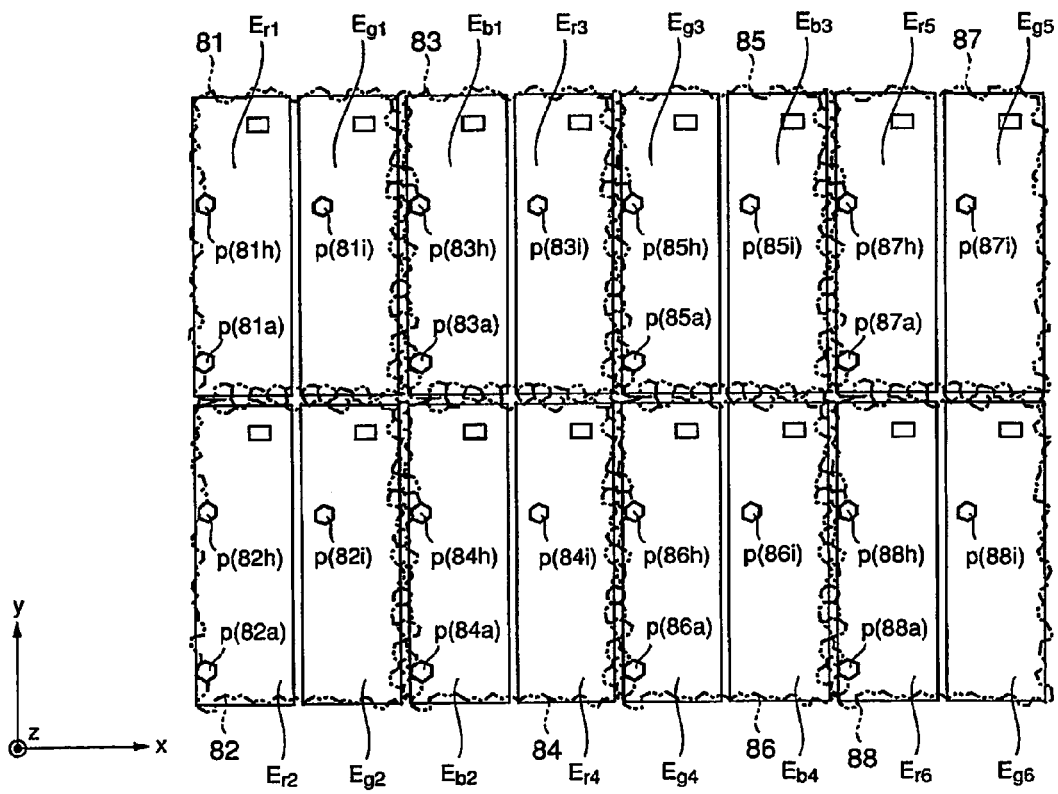

[Fig. 13]
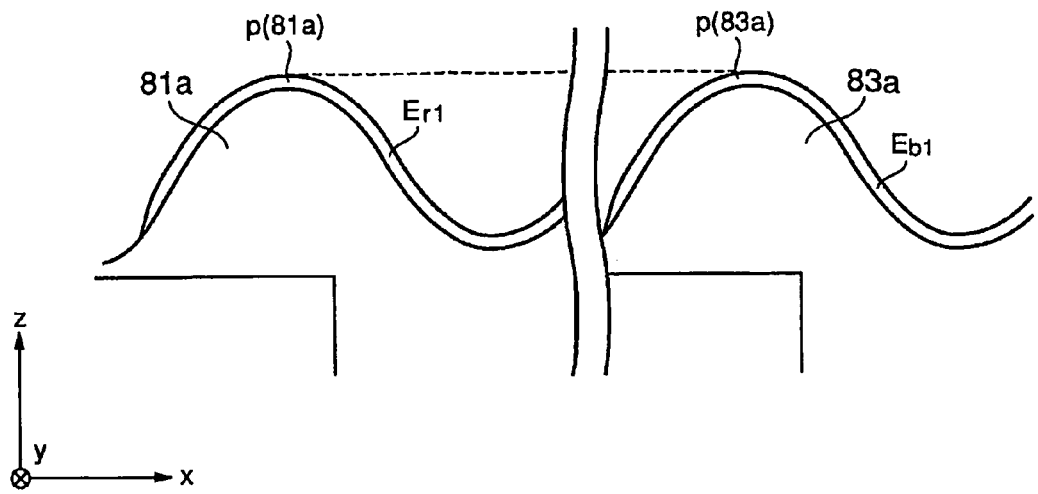
[Fig. 14]
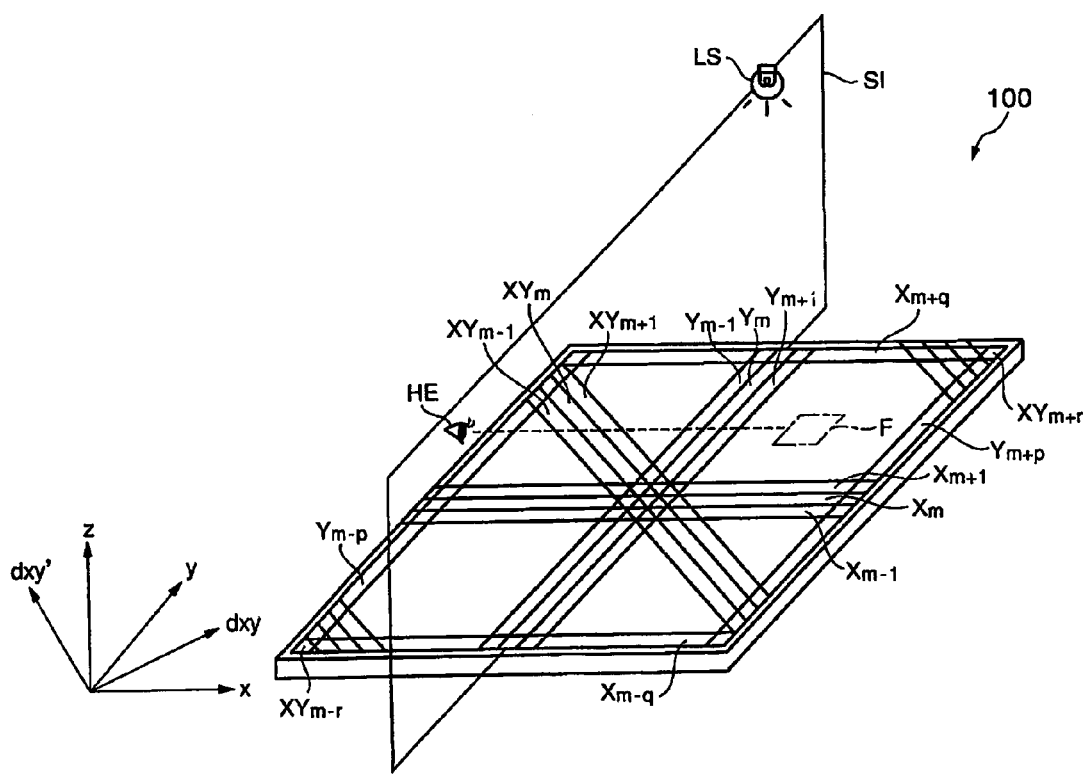

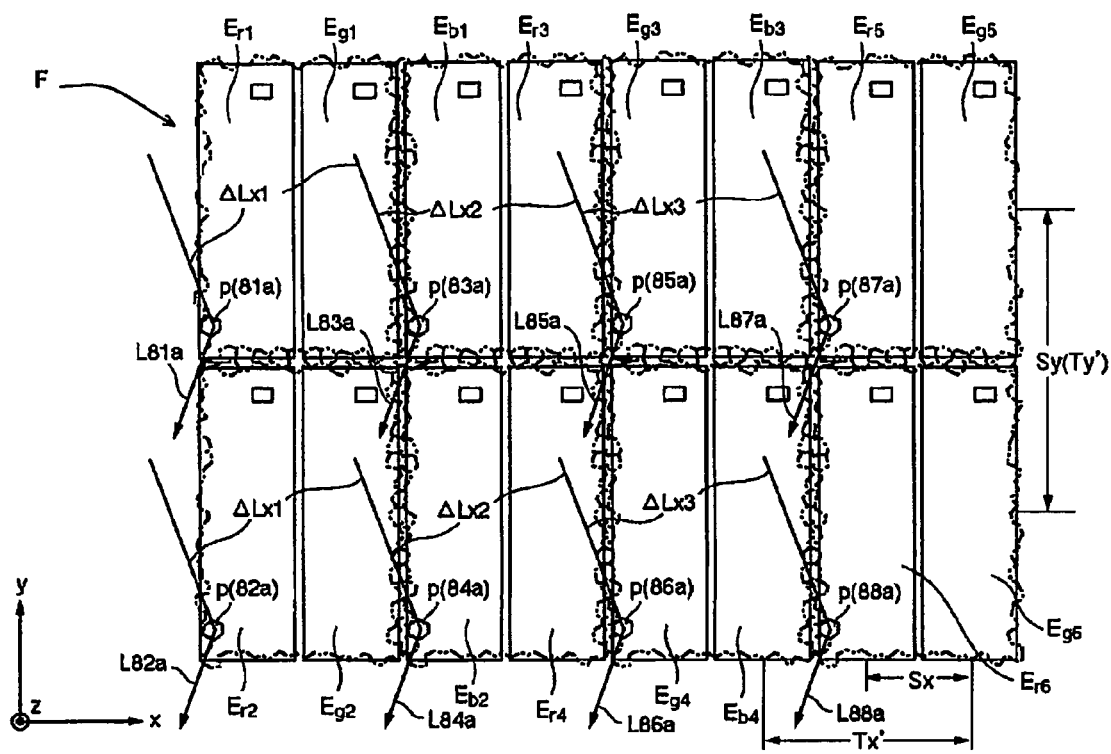
[Fig. 15]

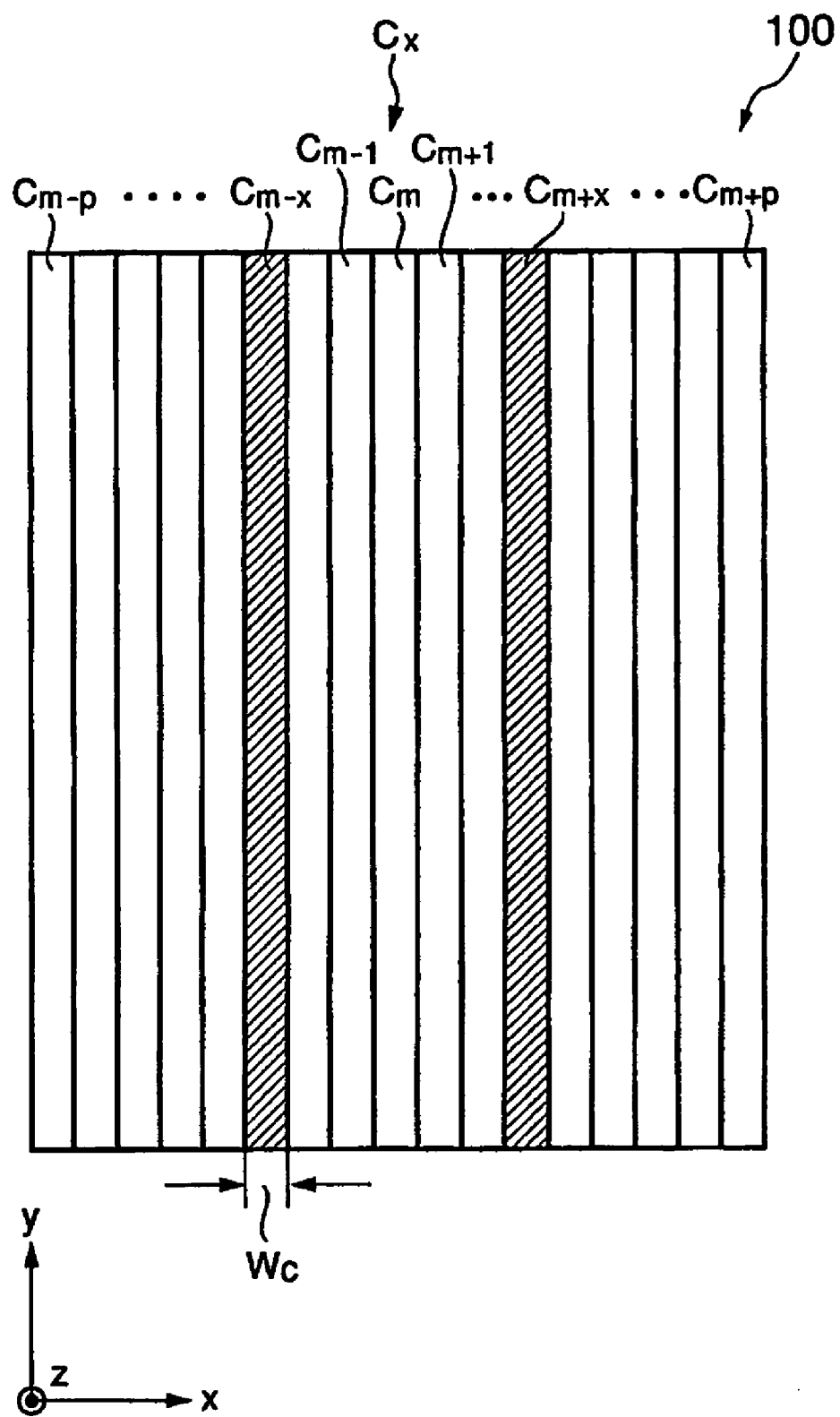
[Fig. 16]

[Fig. 17]
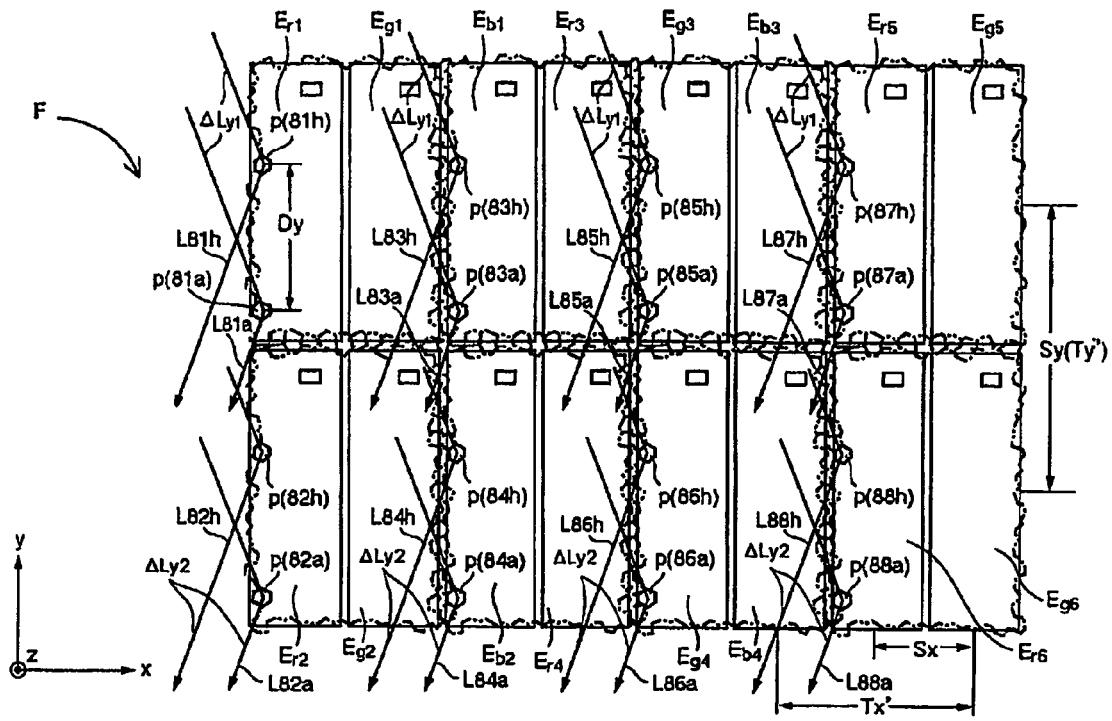
[Fig. 18]
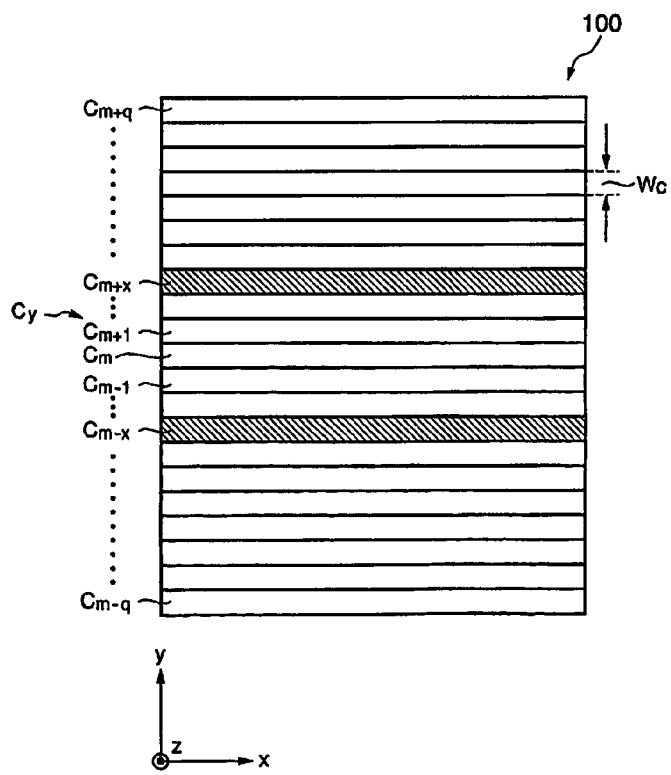

[Fig. 19]
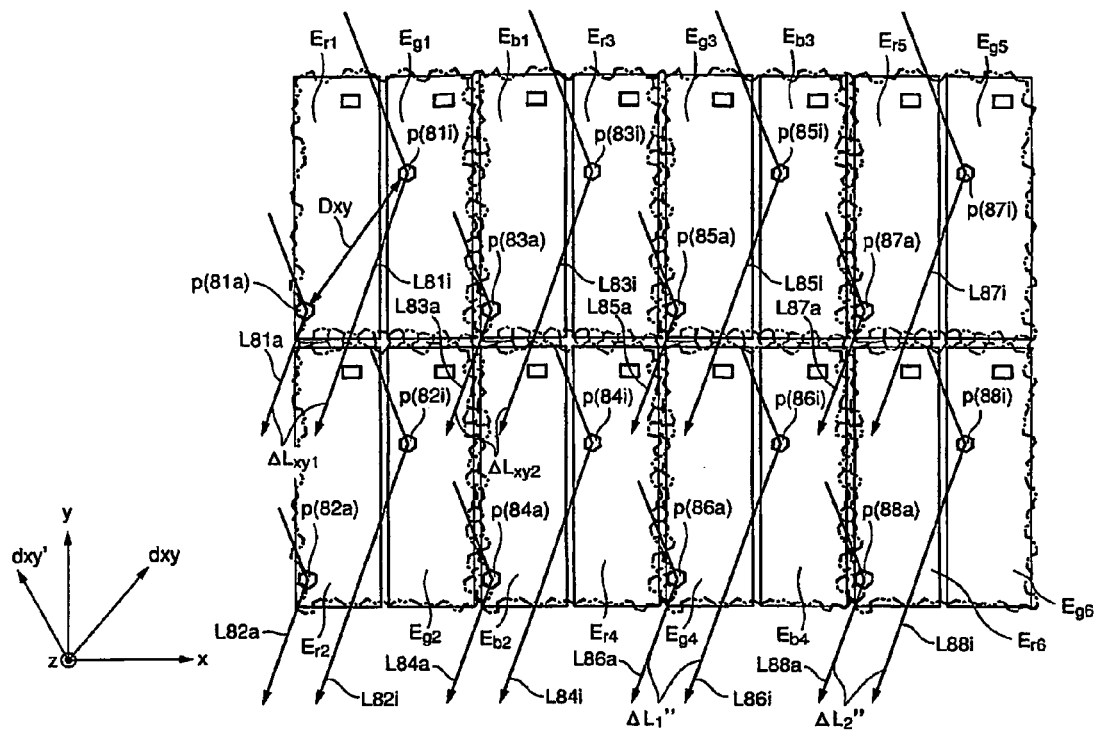
[Fig. 20]
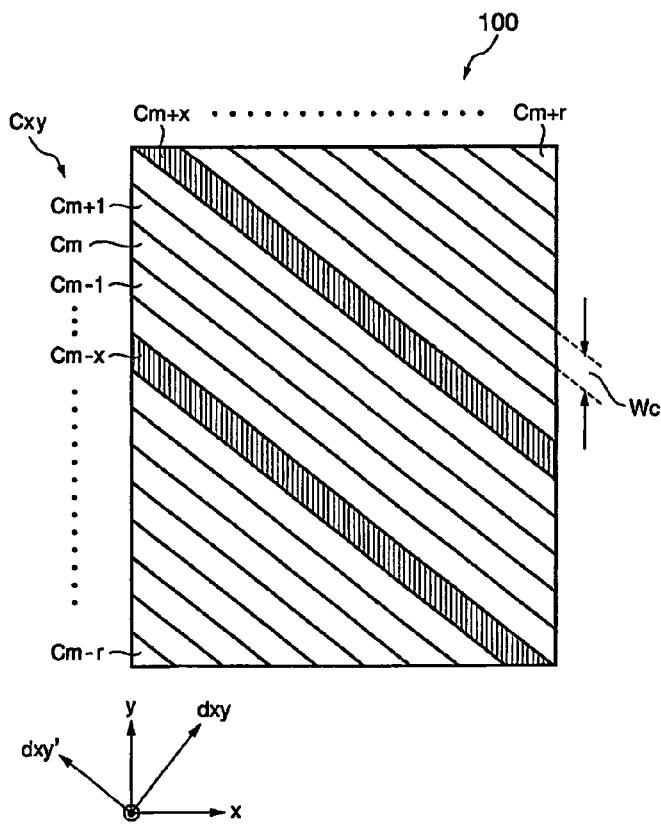

[Fig. 21]
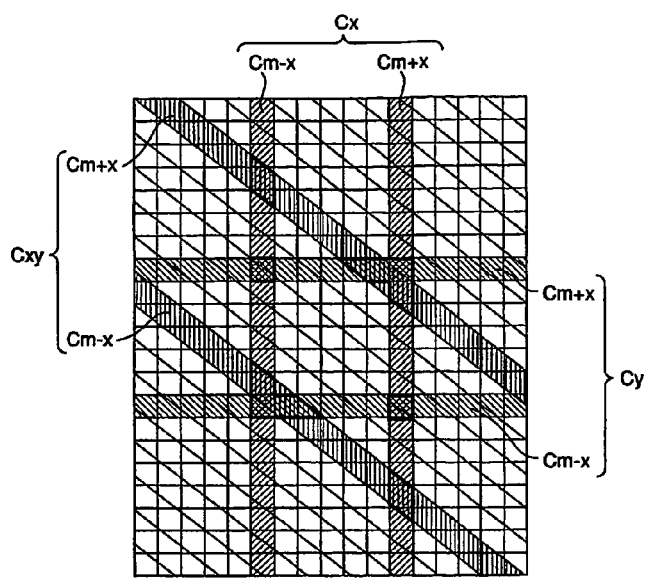
[Fig. 22]
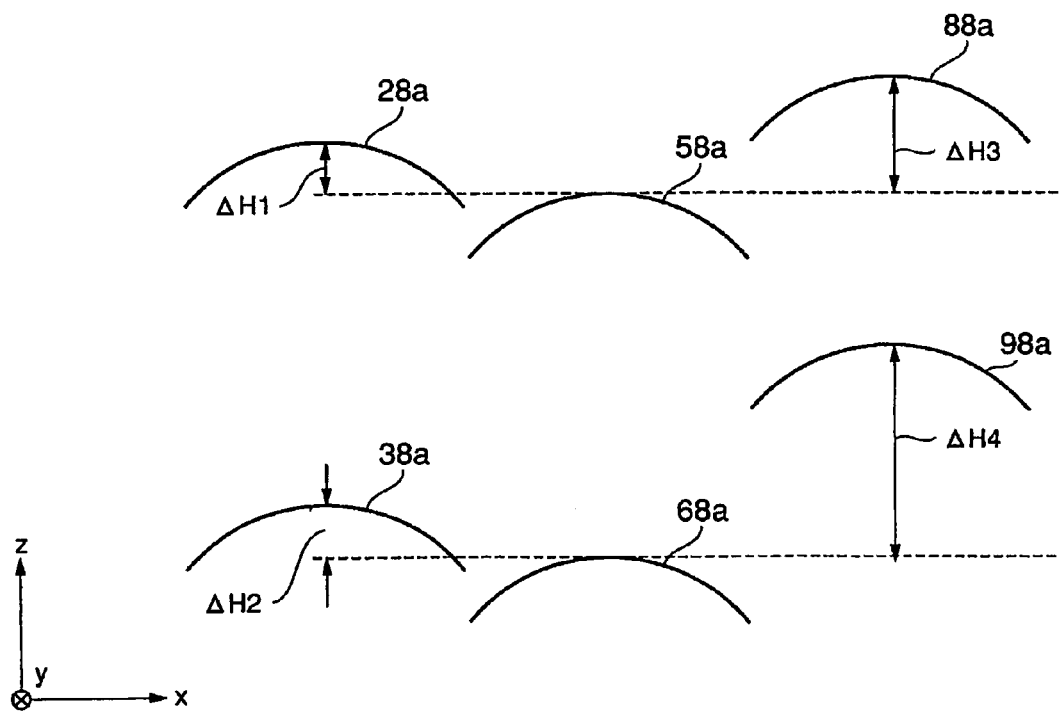

[Fig. 23]
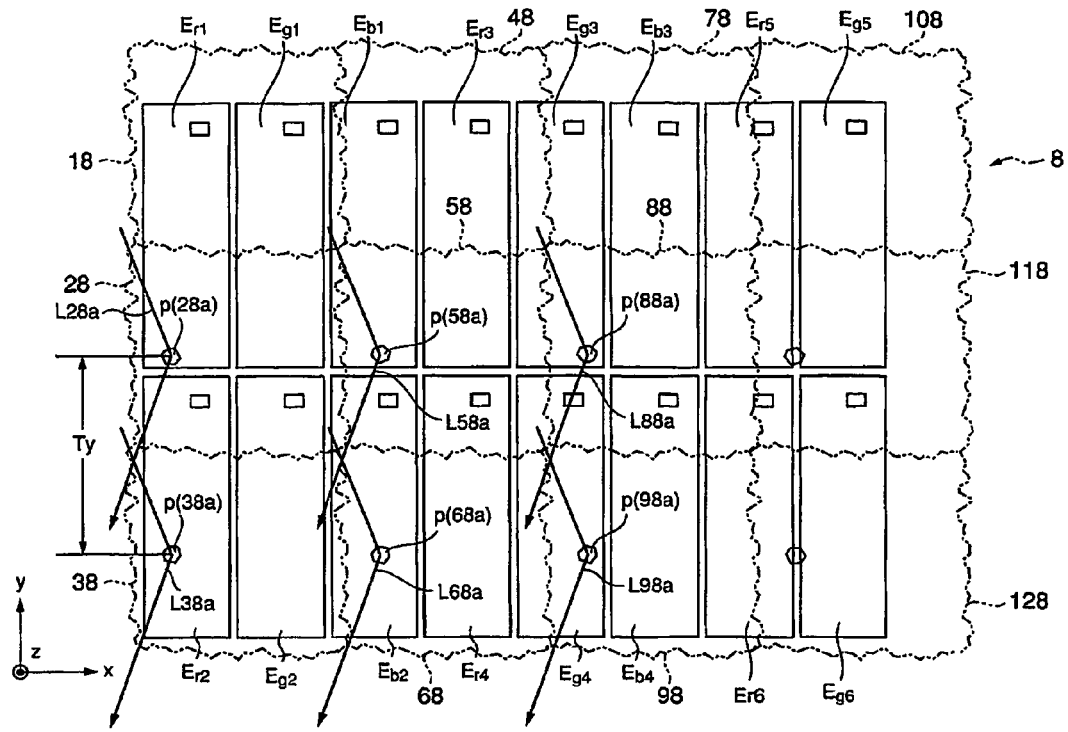
[Fig. 24]
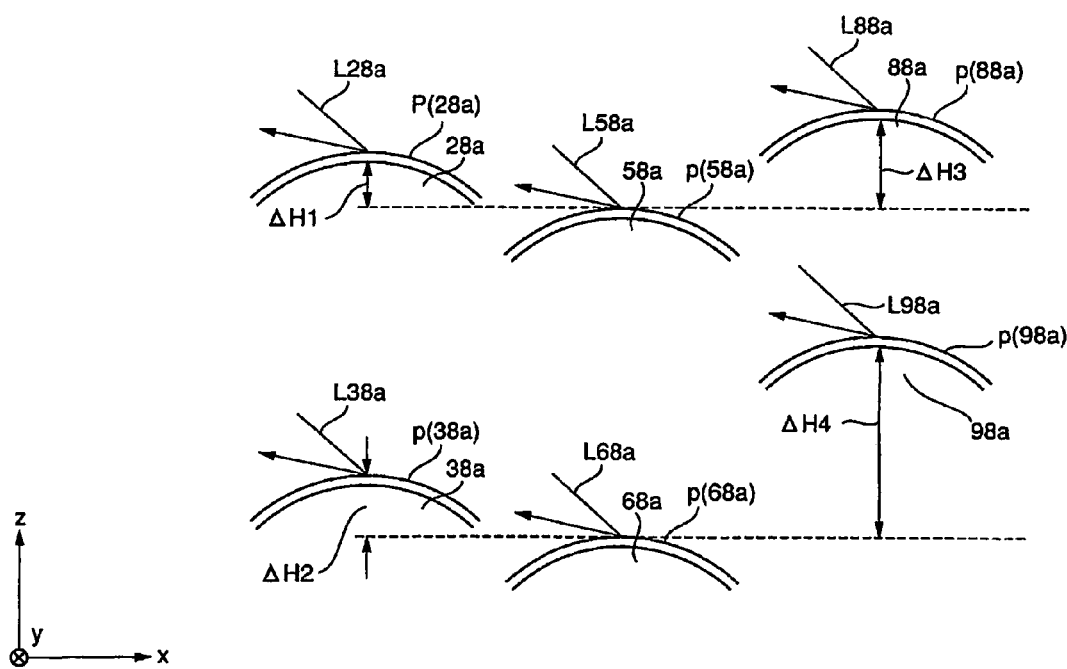

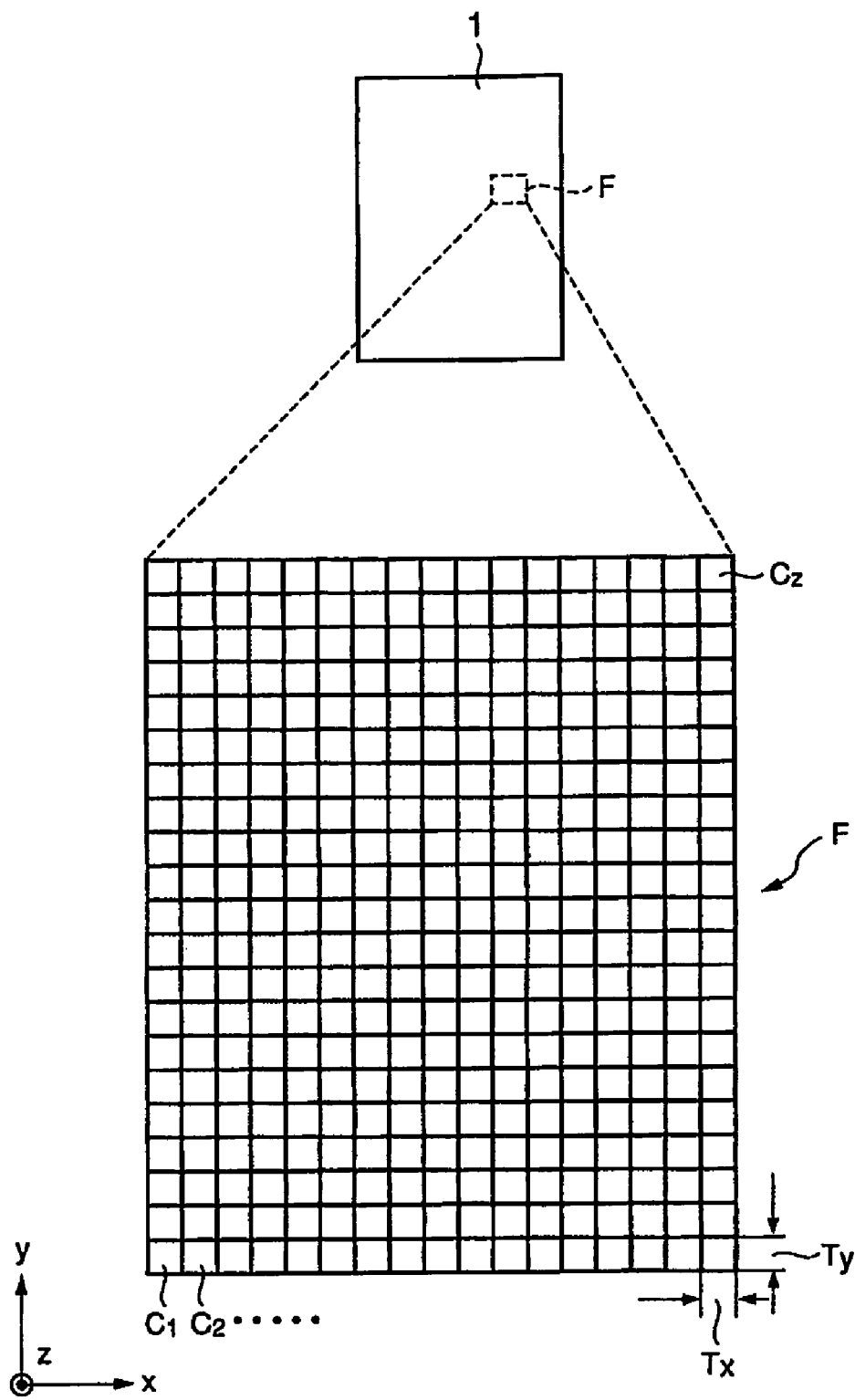
[Fig. 25]

[Fig. 26]
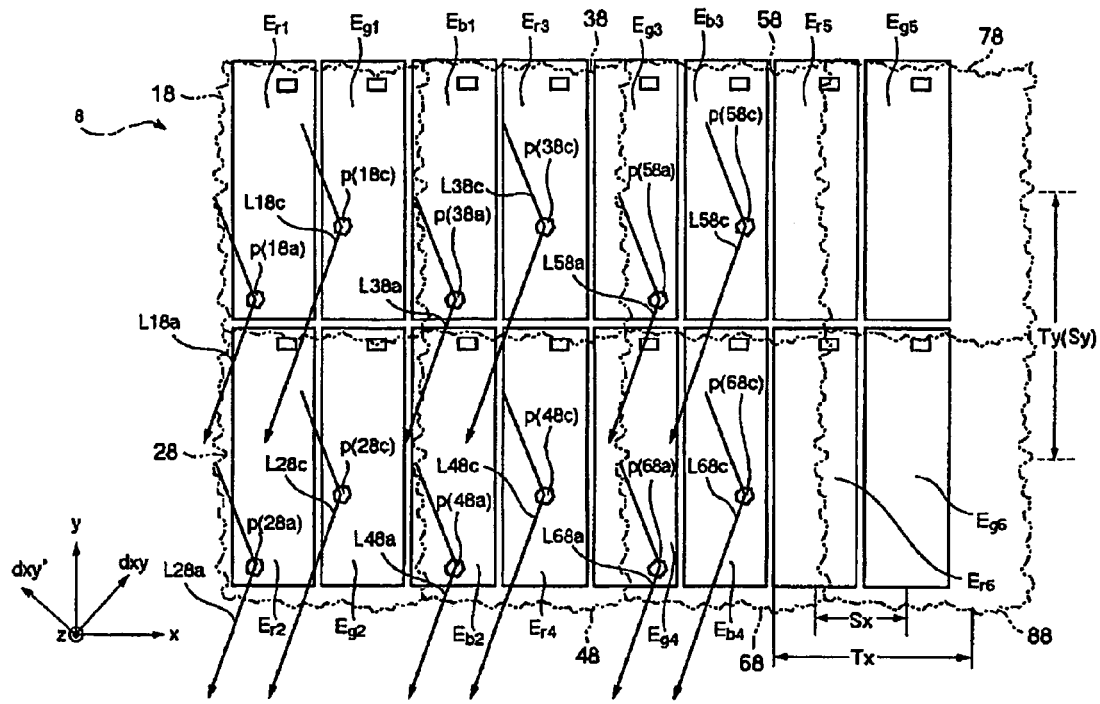
[Fig. 27]
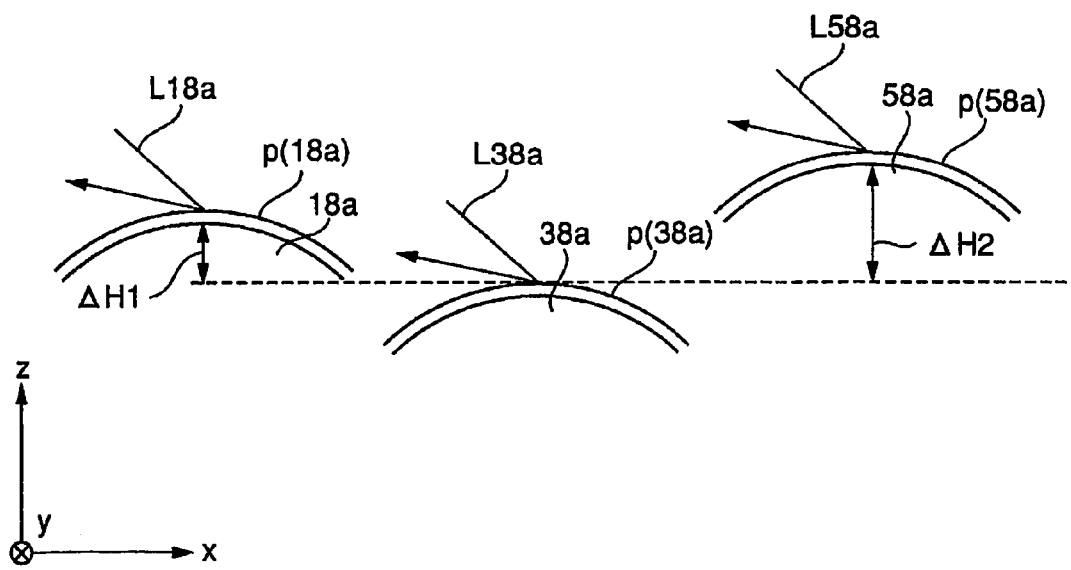

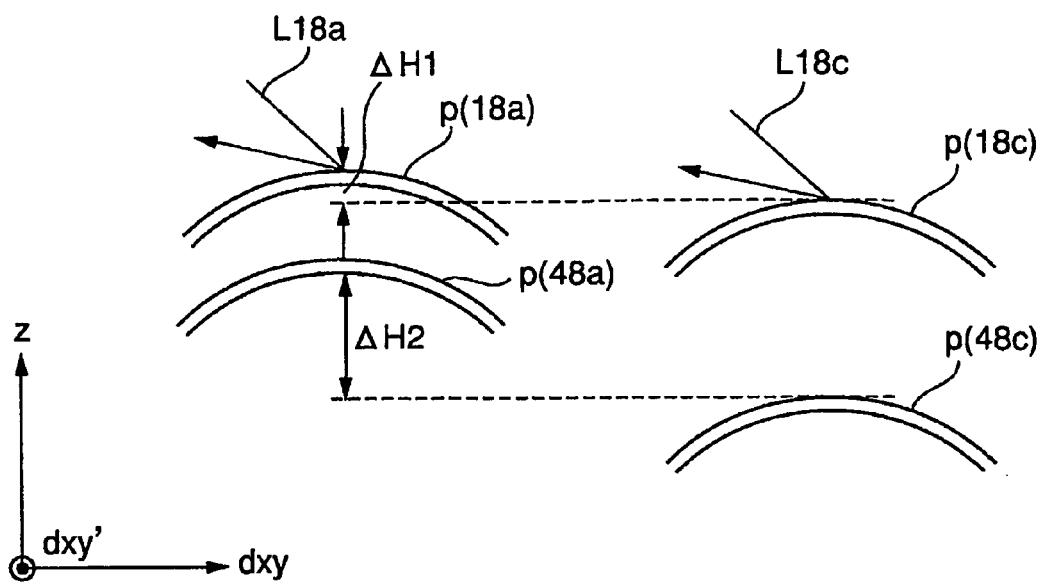
[Fig. 28]
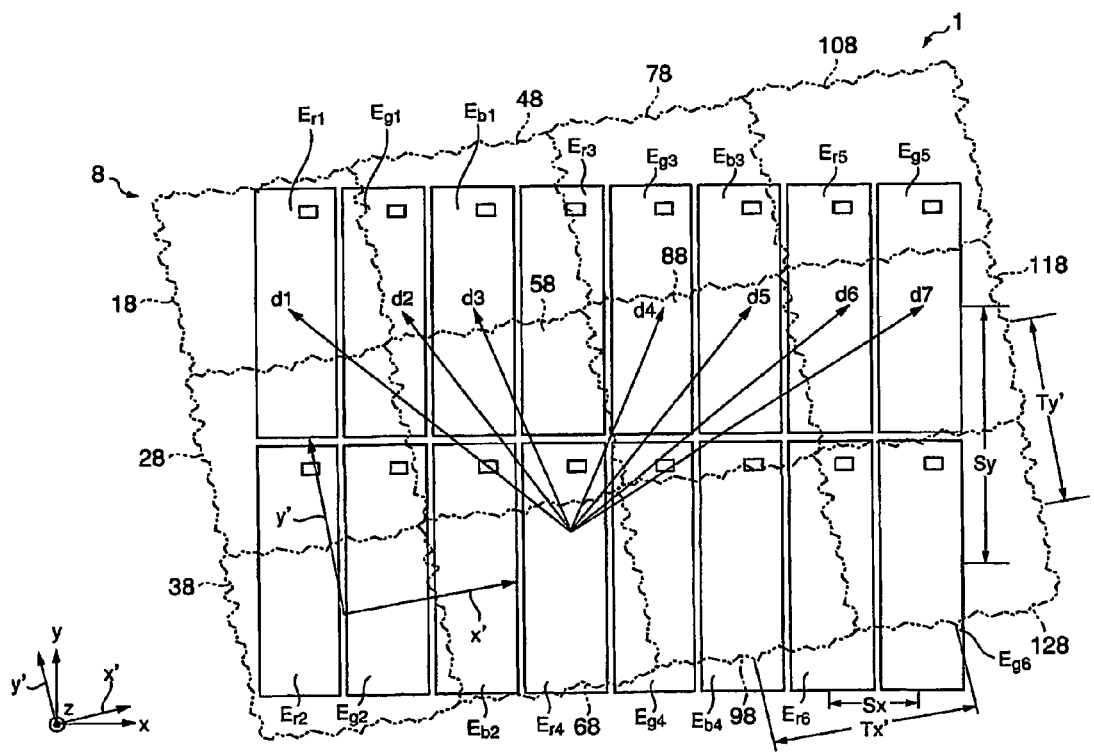
[Fig. 29]

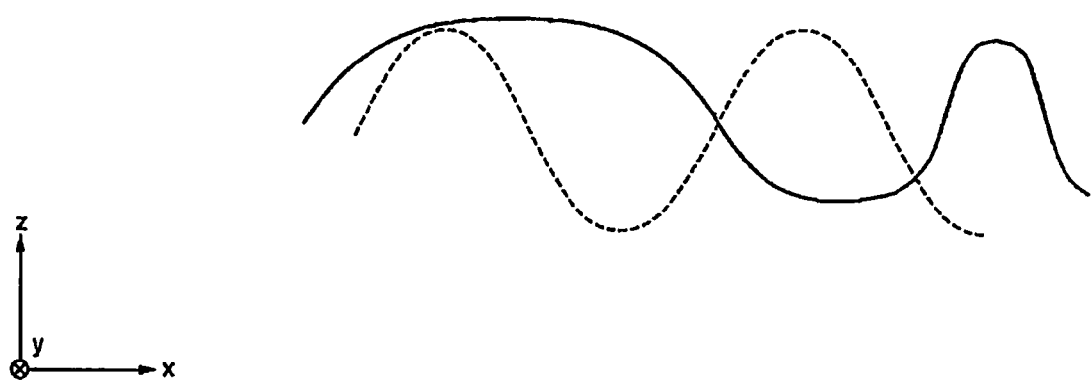
[Fig. 30]

REFLECTIVE STRUCTURE AND AN IMAGE DISPLAY DEVICE HAVING FIRST, SECOND AND THIRD FUNDAMENTAL SURFACES FORMED ON A SUPPORTING MEMBER AND HAVING DIFFERING HEIGHT PORTIONS

TECHNICAL FIELD

The present invention relates to a reflective structure comprising a base, and a reflective means formed on said base.

The present invention further relates to a reflective structure comprising a second base having a plurality of undulating surfaces arranging in a plurality of undulating surface directions, said undulating surfaces having recesses or projections at positions, and a reflective means formed on said second base.

The present invention further relates to an image display device comprising such a reflective structure.

BACKGROUND ART

In recent years, it is required that mobile devices such as mobile telephones display the images with high definition. Accordingly, mobile devices which can display high definition images have been rapidly widespread. However, if viewing the image displayed on a screen of such a mobile device, the user viewing the screen may visually recognize so-called coloring (hereinafter, referred to as merely 'coloring') on the screen. Such coloring is conspicuous when the mobile device is used outdoors. Since the coloring is obstacle when the user views the image displayed on the screen, it is required to eliminate or reduce the coloring.

DISCLOSURE

An object of the present invention is to provide a reflector in which the elimination or reduction of the coloring is achieved, and an image display device to which such a reflector is applied.

A reflective structure according to the present invention for achieving the object described above comprises a base, and a reflective means formed on said base, wherein said base comprises a supporting member provided with a first fundamental surface having portions differing in their height and a second fundamental surface having portions differing in their height, a first undulating portion, formed on said supporting member, having a first recess or projection, and a second undulating portion, formed on said supporting member, having a second recess or projection associated with said first recess or projection, wherein said first and second fundamental surfaces are arranged in a first direction at a first fundamental surface pitch, wherein said first and second undulating portions are arranged in said first direction at a first undulating portion pitch, and wherein the larger pitch of said first fundamental surface pitch and said first undulating portion pitch is a non-integral multiple of the smaller pitch. With such construction, the coloring can be eliminated or reduced.

In the reflective structure of the present invention, said first undulating portion may be continuous with said second undulating portion.

In the reflective structure of the present invention, said first fundamental surface pitch may be equal to a first pixel pitch.

In the reflective structure of the present invention, said reflective means may comprise first and second reflectors, said first and second reflectors arranged in said first direction at said first pixel pitch.

In the reflective structure of the present invention, said supporting member may comprises a first conductive line, a second conductive line, a first driving element for supplying a first reflector of said plurality of first reflectors with data from said first conductive line and a second driving element for supplying a second reflector of said plurality of first reflectors with data from said second conductive line, wherein said first and second conductive lines may be arranged in said first direction at said first pixel pitch, and wherein said first and second driving elements may be arranged in said first direction at said first pixel pitch.

In the reflective structure of the present invention, said supporting member may be provided with a third fundamental surface having portions differing in their height, wherein said base may comprise a third undulating portion, formed on said supporting member, having a third recess or projection associated with said first recess or projection, wherein said first and third fundamental surfaces may be arranged in a second direction at a second fundamental surface pitch, wherein said first and third undulating portions may be arranged in said second direction at a second undulating portion pitch, and wherein the larger pitch of said second fundamental surface pitch and said second undulating portion pitch may be a non-integral multiple of the smaller pitch.

In the reflective structure of the present invention, said first undulating portion may be continuous with said third undulating portion.

In the reflective structure of the present invention, said second fundamental surface pitch may be equal to a second pixel pitch.

In the reflective structure of the present invention, said supporting member may comprise a third conductive line, a fourth conductive line, and a third driving element controlled through said third conductive line, wherein said first driving element is controlled through said fourth conductive line, wherein said third and fourth conductive lines are arranged in said second direction at said second pixel pitch, and wherein said first and third driving elements are arranged in said second direction at said second pixel pitch.

In the reflective structure of the present invention, said reflective means may comprise a third reflector corresponding to said third driving element, said first and third reflectors arranged in said second direction at said second pixel pitch.

In the reflective structure of the present invention, said first and second directions may be row and column directions, respectively.

In the reflective structure of the present invention, said reflective means may comprise a reflective line extending in said first direction.

In another reflective structure of the present invention, a reflective structure may comprise a base, and a reflective means formed on said base, wherein said base may comprise a supporting member provided with a first fundamental surface having portions differing in their height, a second fundamental surface having portions differing in their height, and a third fundamental surface having portions differing in their height, a first undulating portion formed on said supporting member, a second undulating portion formed on said supporting member, and a third undulating portion formed on said supporting member, wherein said first and second fundamental surfaces may be arranged in a first fundamental surface direction at a first fundamental surface pitch of a plurality of fundamental surface pitches, said first fundamental surface pitch being the smallest pitch of said plurality of fundamental surface pitches, wherein said first and third fundamental surfaces may be arranged in a second fundamental surface direction at a second fundamental surface pitch of said plurality of fundamental surface pitches, said second fundamental surface pitch being equal to said first fundamental surface pitch or being the smallest next to said first fundamental surface pitch, wherein said first and second undulating portions may be arranged in a first undulating portion direction at a first undulating portion pitch of a plurality of undulating portion pitches, said first undulating portion pitch being the smallest pitch of said plurality of undulating portion pitches, wherein said first and third undulating portions may be arranged in a second undulating portion direction at a second undulating portion pitch of said plurality of undulating portion pitches, said second undulating portion pitch being equal to said first undulating portion pitch or being the smallest next to said first undulating portion pitch, and wherein at least one of said first and second undulating portion directions may be different from said first and second fundamental surface directions. With such construction, the coloring can be eliminated or reduced.

In this another reflective structure of the present invention, said first to third undulating portion may be continuous.

In this another reflective structure of the present invention, said first fundamental surface pitch may be equal to a first pixel pitch.

In this another reflective structure of the present invention, said reflective means may comprise first and second reflectors, said first and second reflectors arranged in said first fundamental surface direction at said first pixel pitch.

In this another reflective structure of the present invention, said supporting member may comprise a first conductive line, a second conductive line, a first driving element for supplying said first reflector with data from said first conductive line, and a second driving element for supplying said second reflector with data from said second conductive line, wherein said first and second conductive lines may be arranged in said first fundamental direction at said first pixel pitch, and wherein said first and second driving elements may be arranged in said first fundamental direction at said first pixel pitch.

In this another reflective structure of the present invention, wherein said supporting member may comprise a third conductive line, a fourth conductive line, and a third driving element controlled through said third conductive line, wherein said first driving element may be controlled through said fourth conductive line, wherein said third and fourth conductive lines may be arranged in said second direction at said second pixel pitch, and wherein said first and third driving elements may be arranged in said second direction at said second pixel pitch.

In this another reflective structure of the present invention, said reflective means may comprise a third reflector corresponding to said third driving element, said first and third reflectors arranged in said second direction at said second pixel pitch.

In this another reflective structure of the present invention, said reflective means may comprise a reflective line extending in said first fundamental surface direction.

An image display device according to the present invention comprises said reflective structure described above.

DESCRIPTION OF DRAWINGS

FIG. 1 is a perspective view showing a reflective electrode substrate 1 having reflective electrodes E, which is the first embodiment according to reflective structure of the present invention;

FIG. 2 is an enlarged plan view of a region F shown in FIG. 1;

FIG. 3 is a plan view showing a part of a substrate on which each of TFTs is formed within a respective one of sub pixel regions;

FIG. 4 is a cross sectional view of the sub pixel region Ar1 of FIG. 3 taken along a line IV-IV;

FIG. 5 is a plan view of the substrate on which an organic film 8 having undulating surfaces has been formed;

FIG. 6 shows a distribution pattern in a xy plane of projections and recesses of each of the undulating portions 18 to 128 shown in FIG. 5;

FIG. 7 shows an example of a distribution pattern in the xy plane of projections and recesses of the undulating portion having contact holes CH;

FIG. 8 is a plan view of the substrate after an organic film 80 comprising undulating portions arranged at undulating portion pitches Tx' and Ty' is formed, the undulating portion pitch Tx' being an integral multiple of the pixel pitch Sx, the undulating portion pitch Ty' being an integral multiple of the pixel pitch Sy;

FIG. 9 is an enlarged detail of the rectangular undulating portion 81 of the organic film 80 shown in FIG. 8;

FIG. 10 is a schematic cross-sectional view of six projections 81a to 81f existing within the rectangular undulating portions 81 of FIG. 8 at the side of the sub-pixel region Ar1;

FIG. 11 is a cross-sectional view including two projections 81a and 81b within the rectangular undulating portion 81 shown in FIG. 8 and two projections 83a and 83b within the rectangular undulating portion 83, the projections 83a and 83b each being associated with a respective one of the projections 81a and 81b;

FIG. 12 is a plan view of the substrate on which the reflective electrodes Er1, Eg1, Eb1 . . . have been formed;

FIG. 13 is a partial cross-sectional view including the projection p(81a) of the reflective electrode Er1 and the projection p(83a) of the reflective electrode Eb1 shown in FIG. 12;

FIG. 14 is illustration of irradiating the conventional substrate 100 with light;

FIG. 15 is an enlarged view of the region F shown in FIG. 14;

FIG. 16 is a simulation result of the color profile recognized on the conventional substrate 100 by the viewer HE;

FIG. 17 is an enlarged view of the region F shown in FIG. 14;

FIG. 18 is a simulation result of the color profile recognized on the substrate by the viewer HE;

FIG. 19 is an enlarged view of the region F shown in FIG. 14;

FIG. 20 is a simulation result of the color profile recognized on the substrate by the viewer HE;

FIG. 21 shows the superimposed color profiles Cx, Cy and Cxy;

FIG. 22 is a schematic cross-sectional view of six associating projections 28a, 38a, 58a, 68a, 88a, and 98a of the six undulating portions 28, 38, 58, 68, 88 and 98 of FIG. 5, viewed in the y direction;

FIG. 23 is an enlarged view of the region F shown in FIG. 1;

FIG. 24 is a schematic cross-sectional view of six projections p(28a) to p(98a) shown in FIG. 23, viewed in the y direction;

FIG. 25 is a conceptual illustration of the colors recognized on the reflective electrode substrate 1 by the viewer HE;

FIG. 26 is a plan view of a reflective electrode substrate of the second embodiment in which only the relationship between the undulating portion pitch Tx and the pixel pitch Sx is non-integral multiple;

FIG. 27 is a schematic cross-sectional view of the projections p(18a), p(38a) and p(58a) arranged in the x direction shown in FIG. 26, viewed in the y direction;

FIG. 28 is a schematic cross-sectional view of the pair of the projections p(18a) and p(18c) and the pair of the projections p(48a) and p(48c) shown in FIG. 26, viewed in the dxy' direction;

FIG. 29 is a plan view of a part of a reflective electrode substrate 1 of the third embodiment, which can eliminate or reduce the coloring by the different method from the first and second embodiments; and FIG. 30 shows a profile schematically representing the shape of the cross section of the first and second rectilinear undulating portions 91 and 92 (see FIG. 8) of the conventional substrate 100 and a profile schematically representing the shape of the cross section of the rectangular undulating portions of the conventional substrate 100.

BEST MODE

FIG. 1 is a perspective view showing a reflective electrode substrate 1 having reflective electrodes E, which is the first embodiment according to reflective structure of the present invention. The reflective electrode substrate 1 can be used as a substrate for an image display device such as a liquid crystal display device.

This reflective electrode substrate 1 comprises a number of reflective electrodes E arranged in a matrix array and a terminal portion TG for connecting to external circuits.

FIG. 2 is an enlarged plan view of a region F shown in FIG. 1.

The reflective electrode substrate 1 comprises an organic layer 8 having projections and recesses on its surface. On the organic layer 8, reflective electrodes Er1 . . . are formed. Since the organic layer 8 has the recesses and projections, the reflective electrodes also have projections and recesses accordingly. In FIG. 2, the reflective electrode Er1 for use in displaying a red image, the reflective electrode Eg1 for use in displaying a green image, the reflective electrode Eb1 for use in displaying a blue image, and so on are arranged in a x direction (row direction) at a pixel pitch Sx and are arranged in a y direction (column direction) at a pixel pitch Sy. It is noted that a pattern of the projections and recesses of the organic layer 8 is designed independently of the sub pixel regions. In this embodiment, by designing the pattern of the projections and recesses of the organic layer 8 independently of the sub pixel regions, it is achieved that, as described later, we can easily design the pattern of the projections and recesses of the organic layer 8 in such a way that a viewer hardly recognizes the coloring when the viewer sees the reflective electrode substrate 1. A method of manufacturing the reflective electrode substrate 1 will be described below.

First, each of TFTs is formed on a glass substrate within a respective one of sub pixel regions, in order to manufacture the reflective electrode substrate 1.

FIG. 3 is a plan view showing a part of a substrate on which each of TFTs is formed within a respective one of sub pixel regions.

In FIG. 3, the sub pixel regions Ar1, Ag1, Ab . . . arranged in the x direction at the pixel pitch Sx and arranged in the y direction at the pixel pitch Sy are surrounded by chain lines. Within each sub pixel region, TFT is formed. Such TFTs are manufactured by forming gate electrodes 2, gate lines 3, semiconductor layers 4, source electrodes 5, source lines 6, drain electrodes 7 and others on the glass substrate. The gate lines 3 are arranged in the y direction at the pixel pitch Sy and the source lines 6 are arranged in the x direction at the pixel pitch Sx. TFTs are arranged in the x direction at the pixel pitch Sx and are arranged in the y direction at the pixel pitch Sy.

FIG. 4 is a cross sectional view of the sub pixel region Ar1 of FIG. 3 taken along a line IV-IV.

Since the source lines 6 have been formed on the glass substrate 50, a surface of the substrate after the source lines 6 have been formed comprises a surface Sf. The surface Sf has portions K1 and K2 differing in their height in z direction (hereinafter, the surface Sf is referred to as "fundamental surface" Sf). In FIG. 4, the portions K1 formed by the source lines 6 are shown, but it is also noted that portions differing in their height in z direction are formed by the gate lines 3 and the TFTs. Further, no Cs lines is formed in this embodiment, but assuming that the Cs lines are formed, the portions differing in their height are formed by the Cs lines. In this embodiment, it is noted that the TFTs, the gate lines 3, the source lines 6 or others, which cause the fundamental surface Sf having such portions K1 and K2, are arranged in the x direction at the pixel pitch Sx and are arranged in the y direction at the pixel pitch Sy, as shown in FIG. 3. It is therefore noted that the fundamental surface Sf having portions K1 and K2 as shown in FIG. 4 is formed within the other sub pixel region than the sub pixel region Ar1, so the fundamental surfaces Sf as shown in FIG. 4 are arranged in the x direction at the pixel pitch Sx and are arranged in the y direction at the pixel pitch Sy.

After forming the TFT within each sub pixel region as shown in FIG. 3 and before forming reflective electrodes, an organic film having undulating surfaces is formed in order to form the reflective electrodes each having projections and recesses at its surface (see FIG. 5).

FIG. 5 is a plan view of a part of the substrate on which an organic film 8 having undulating surfaces has been formed.

The organic layer 8 has contact holes CH each for connecting a respective one of the reflective electrodes formed later to a respective one of the drain electrodes of TFTs. Further, the organic layer 8 comprises a number of undulating portions each having projections and recesses. In FIG. 5, as the representative of the undulating portions, twelve undulating portions 18 to 128 are shown with each of the portions 18 to 128 surrounded by solid line. This organic film 8 may be formed, for example, as a single layer film or as a combination of a number of projection elements and a planarization film covering the projection elements.

FIG. 6 shows a distribution pattern in a xy plane of projections and recesses of each of the undulating portions 18 to 128 shown in FIG. 5.

White polygons shown in FIG. 6 correspond to projections, and regions sandwiched among white polygons correspond to recesses. The projections are arranged within the undulating portion at random, and the recesses expand so as to weave among the projections. Each of the undulating portions of the organic film 8 basically has the distribution of projections and recesses shown in FIG. 6, but it is noted that if the contact holes CH are required in the undulating portions, the contact holes CH are added to the pattern of projections and recesses shown in FIG. 6. For example, since four undulating portions 38, 68, 98 and 128 arranged in the x direction requires no contact holes CH (see FIG. 5), the portions 38, 68, 98 and 128 have the same distribution of the projection and recesses as shown in FIG. 6, whereas since the other eight undulating portions 18, 28, 48, 58, 78, 88, 108 and 118 require the contact holes CH, the contact holes CH are added to the pattern of projections and recesses shown in FIG. 6. For example, a distribution of projections and recesses of the undulating portion 18 is shown as FIG. 7. Unlike FIG. 6, FIG. 7 contains two contact holes CH corresponding to the drain electrodes of two sub-pixel regions Ar1 and Ag1. However, it is also noted that the distribution of the projections and recesses of FIG. 7 is the same as that of FIG. 6 in the xy plane, except that the contact holes CH are added. Further, the pattern of projections and recesses of the undulating portion is not limited to the pattern described above and may be a pattern in which, for example, the projections and recesses shown in FIG. 6 are inverted. The undulating portion has the substantially rectangular shape as shown in FIGS. 6 and 7, but may have a different shape (for example, a substantially hexagon shape).

The undulating portions 18 to 128 having such pattern of projection and recesses are arranged in the matrix array as shown in FIG. 5. The undulating portions 18 to 128 are arranged in the x direction at an undulating portion pitch Tx and in the y direction at an undulating portion pitch Ty, and thus arranged in a ds direction slanting with respect to the x and y directions at an undulating portion pitch Ts. The undulating portion pitches Tx and Ty are different from the pixel pitches Sx and Sy, respectively. The undulating portion pitch Tx is larger than the pixel pitch Sx and the undulating portion pitch Ty is smaller than the pixel pitch Sy. It is noted that the undulating portion pitch Tx is defined so as not to equal to an integral multiple of the pixel pitch Sx and that the undulating portion pitch Ty is defined in such a way that the pixel pitch Sy does not equals to an integral multiple of the pitch Ty. In the first embodiment, Tx is defined as Tx=($17/8$) Sx and Ty is defined as Ty=($17/23$) Sy, but it is noted that Tx and Ty are not limited to this values. After forming the organic film 8 which has the undulating portions as described above, the reflective electrodes Er1, Eg1, Eb1 . . . are formed as shown in FIG. 2. Since the reflective electrodes Er1, Eg1, Eb1 . . . are formed on the organic film 8 having the undulating portions, the reflective electrodes have patterns of projections and recesses which correspond to the pattern of projections and recesses of the organic film 8.

As described above, the relation between the undulating portion pitch Tx of the organic film 8 and the pixel pitch Sx is not an integral multiple but a non-integral multiple, and the relation between the undulating portion pitch Ty of the organic film 8 and the pixel pitch Sy is not an integral multiple but a non-integral multiple. The non-integral multiple relation between the undulating portion pitch and the pixel pitch makes it possible to effectively reduce the coloring recognized on the reflective electrode substrate 1. Hereinafter, this reason will be described by comparing with the case in which an organic film has undulating portions arranged at an integral multiple of the pixel pitch.

FIG. 8 is a plan view of the substrate after an organic film 80 comprising undulating portions arranged at undulating portion pitches Tx' and Ty' is formed, the undulating portion pitch Tx' being an integral multiple of the pixel pitch Sx and, the undulating portion pitch Ty' being an integral multiple of the pixel pitch Sy.

The organic film 80 comprises rectangular undulating portions, first rectilinear undulating portions and second rectilinear undulating portions. FIG. 8 representatively shows eight rectangular undulating portions 81 to 88, and continued first and second rectilinear undulating portions 91 and 92 among the eight rectangular undulating portions 81 to 88, the first rectilinear undulating portions 91 extending in the x direction and the second rectilinear undulating portions 92 extending in the y direction. The rectangular undulating portions 81 to 88 are arranged in the x direction at the undulating portion pitch Tx' (=2Sx) which is two times the pixel pitch Sx and arranged in the y direction at the undulating portion pitch Ty' (=Sy) equal to the pixel pitch Sy. Therefore, the first rectilinear undulating portions 91 are arranged in the x direction at the undulating portion pitch Tx' (=2Sx) and arranged in the y direction at the undulating portion pitch Ty' (=Sy). Ditto for the second rectilinear undulating portions 92. Further, a region which is not illustrated in FIG. 8 comprises undulating portions having the same pattern of projections and recesses as the undulating portions illustrated in FIG. 8.

FIG. 9 is an enlarged detail of the rectangular undulating portion 81 of the organic film 80 shown in FIG. 8.

The rectangular undulating portion 81 is formed on the substantially whole two sub-pixel regions. The rectangular undulating portion 81 comprises a number of projections 81a, 81b, . . . , 81z arranged at random and recesses 811 weaving among the number of projections 81a, 81b, . . . , 81z. In FIG. 9, the projections 81a, 81b, . . . , 81z are shown by white polygons and the recesses 811 are shown by hatching. The rectangular undulating portion 81 comprises two contact holes CH. The other rectangular undulating portions 82 to 88 also comprise the same pattern of projections and recesses as that of FIG. 9. The rectangular undulating portions comprise the pattern of projections and recesses shown in FIG. 9 as described above, but it is noted that, in FIG. 8, only some of projections are illustrated within each rectangular undulating portion from the point of easy understanding of Figure.

Unlike the rectangular undulating portions shown in FIG. 5, each of the rectangular undulating portions shown in FIG. 8 comprise two contact holes CH since the undulating portion pitch Tx' is an integral multiple of the pixel pitch Sx and the undulating portion pitch Ty' is an integral multiple of the pixel pitch Sy.

Further, the first rectilinear undulating portions 91 extending in the x direction have the same pattern of projections and recesses, and the second rectilinear undulating portions 92 extending in the y direction have the same pattern of projections and recesses.

FIG. 10 is a schematic cross-sectional view of six projections 81a to 81f existing within the rectangular undulating portions 81 of FIG. 8 at the side of the sub-pixel region Ar1.

Since the rectangular undulating portion 81 is formed on the fundamental surface Sf (see FIG. 4) having the portions K1 and K2 differing in their height, the projections of the rectangular undulating portion 81 vary in their height in the z direction. The closer the projection of the rectangular undulating portion 81 is to the portion K1, the higher its height in the z direction is. And the further the projection is from the portion K1, the lower its height in the z direction is. Therefore, if six projections 81a to 81f shown in FIG. 10 are compared with each other, six projections 81a to 81f become lower in the z direction in the order of the projections 81a, 81b and 81c and become higher in the z direction in the order of the projections 81d, 81e and 81f. In FIG. 10, the rectangular undulating portion 81 covers the portions K1 and K2 differing in their height. Such portions differing in their height are also formed by, for example, an existence of the gate lines, so the closer the projection of the rectangular undulating portion 81 is to the gate lines, the higher its height in the z direction is. It is noted that the projections of the rectangular undulating portion 81 vary in their height in the z direction, depending on a position of the projection within a xy surface (see FIG. 8).

Further, it is noted that the rectangular undulating portions 81 to 88 have the common pattern of projections and recesses shown in FIG. 9 and thus if the patterns of the rectangular undulating portions 81 to 88 are superimposed within xy surface, superimposed projections occur. For example, the projection 81a of the rectangular undulating portion 81 is superimposed on the projections 83a of the other rectangular undulating portion 83. Hereinafter, such superimposed projections are defined as projections associated with each other (hereinafter referred to as "associating projections") and the associating projections are labeled with the same alphabet. For example, the projections 81a and 83a of the rectangular undulating portions 81 and 83 are both labeled with alphabet 'a' and thus are the associating projections. Further, the associating projections have the same height in the z direction since not only the rectangular undulating portion 81 but also the other rectangular undulating portions are formed on the same fundamental surface as FIG. 4. This is shown in FIG. 11.

FIG. 11 is a cross-sectional view including two projections 81a and 81b of the rectangular undulating portion 81 shown in FIG. 8 and two projections 83a and 83b of the rectangular undulating portion 83, the projections 83a and 83b each being associated with a respective one of the projections 81a and 81b.

Since the projection 81a of the rectangular undulating portion 81 is associated with the projection 83a of the rectangular undulating portion 83, these projections 81a and 83a have the same height in the z direction. Similarly, since the projection 81b of the rectangular undulating portion 81 is associated with the projection 83b of the rectangular undulating portion 83, these projections 81b and 83b have the same height in the z direction. If the height difference between the projections 81a and 81b within the rectangular undulating portion 81 is represented with #H, the height difference between the projections 83a and 83b within the rectangular undulating portion 83 also can be represented with #H. Therefore, a height distribution in the z direction of the projections within the rectangular undulating portion 83 is the substantially same as that of the projections within the rectangular undulating portion 81. Accordingly a height distribution in the z direction of the recesses within the rectangular undulating portion 83 is the substantially same as that of the recesses within the rectangular undulating portion 81. Similarly, height distributions in the z direction of the projections and recesses within the other rectangular undulating portions are the substantially same as that of the projections and recesses within the rectangular undulating portion 81.

After the organic film 80 is formed which has the rectangular undulating portions having such same pattern of projections and recesses, the reflective electrodes are formed (see FIG. 12).

FIG. 12 a plan view of the substrate on which the reflective electrodes Er1, Eg1, Eb1 . . . have been formed. In FIG. 12, the source lines and others are omitted.

Two reflective electrodes are formed on one rectangular undulating portion. Since eight rectangular undulating portions 81 to 88 are illustrated in FIG. 12, sixteen reflective electrodes Er1, Eg1, Eb1 . . . are illustrated. The reflective electrodes Er1, Eg1, Eb1 . . . are formed so as to follow shapes of the rectangular undulating portions 81 to 88, so that the reflective electrodes Er1, Eg1, Eb1 . . . also have the pattern of projections and recesses corresponding to the rectangular undulating portions 81 to 88. The rectangular undulating portions 81 to 88 have the same pattern of projections and recesses, and two reflective electrodes are formed on one rectangular undulating portion, so that two kinds of patterns of projections and recesses of reflective electrodes appear. In FIG. 12, two kinds of patterns of projections and recesses of the reflective electrodes appear alternatively in the x direction. Further, in FIG. 12, only some projections of the reflective electrodes are illustrated. Specifically, (A), (B) and (C) described below are illustrated.

(A) Eight projections p(81a) to p(88a) of the reflective electrodes are illustrated. Each of eight projections p(81a) to p(88a) is formed on a respective one of eight associating projections 81a to 88a of the rectangular undulating portions 81 to 88 shown in FIG. 8.

(B) Eight projections p(81h) to p(88h) of the reflective electrodes are illustrated. Each of eight projections p(81h) to p(88h) is formed on a respective one of eight associating projections 81h to 88h of the rectangular undulating portions 81 to 88 shown in FIG. 8.

(C) Eight projections p(81i) to p(88i) of the reflective electrodes are illustrated. Each of eight projections p(81i) to p(88i) is formed on a respective one of eight associating projections 81i to 88i of the rectangular undulating portions 81 to 88 shown in FIG. 8.

For example, only two projections p(81a) and p(81h) are illustrated in the reflective electrode Er1 and only one projection p(81i) is illustrated in the reflective electrode Eg1. It is noted that the characters between parentheses in reference characters representing the projection of reflective electrode are used as characters for distinction. The characters for distinction indicate that a projection of a reflective electrode is formed on which one of rectangular undulating portions and is formed on which one of rectangular undulating portion's projections. For example, if a projection of a reflective electrode is formed on the projection 81a of the rectangular undulating portion 81, the projection of reflective electrode in question is labeled with '(81a)', and if a projection of a reflective electrode is formed on the projection 83a of the rectangular undulating portion 83, the projection of reflective electrode in question is labeled with '(83a)'. Ditto for the other projections.

FIG. 13 is a partial cross-sectional view including the projection p(81a) of the reflective electrode Er1 and the projection p(83a) of the reflective electrode Eb1 shown in FIG. 12.

The projections p(81a) and p(83a) of the reflective electrodes Er1 and Eb1 are formed on the projections 81a and 83a of the rectangular undulating portions 81 and 83, respectively. The projections 81a and 83a of the rectangular undulating portions 81 and 83 are labeled with the same alphabet 'a' and thus are the associating projections, so the projections 81a and 83a have the same height in the z direction as described with reference to FIG. 11. The reflective electrodes Er1 and Eb1 have the substantially equal film thickness, so that the projection p(83a) of the reflective electrode Eb1 has the same height as the projection p(81a) of the reflective electrode Er1 in the z direction. The projections p(82a), p(84a), p(85a), p(86a), p(87a) and p(88a) of the other reflective electrodes also have the same height as the projection p(81a) of the reflective electrode Er1 in the z direction, but this is not shown in FIG. 13. The above description is given to the projections p(81a) to p(88a) of the reflective electrodes, but the same description is given to the other projections of the reflective electrodes. In FIG. 12, eight projections p(81a) to p(88a) have the same height in the z direction, eight projections p(81h) to p(88h) have the same height in the z direction, and eight projections p(81i) to p(88i) have the same height in the z direction.

As described above, the reflective electrodes (see FIG. 12) are formed on the organic film 80 (see FIG. 8) comprising the rectangular undulating portions 81 to 88, so the reflective electrode substrate (referred to as 'conventional substrate') is manufactured. Next, we discuss the coloring recognized on the conventional substrate by irradiating the conventional substrate with light.

FIG. 14 is illustration of irradiating the conventional substrate 100 with light. It is noted that the terminal portion for connecting to the external circuit is omitted from the conventional substrate 100 shown in FIG. 14.

A light source LS and an viewer HE exist within a virtual surface SI which passes through a center of the conventional substrate 100 and is perpendicular to the conventional substrate 100. The light source LS emits light toward the conventional substrate 100. Since each reflective electrode of the conventional substrate 100 comprises a number of projections, light from the light source LS is reflected from the number of projections of the reflective electrodes and the reflected lights reach to the viewer HE while interfering each other. In order to easily discuss the interference of lights reflected from the projections of the reflective electrodes, this interference of lights is classified as three cases (1), (2) and (3) described below and explained in detail.

(1) The interference of lights reflected from the projections arranged in the x direction at a predetermined interval.

For the purpose of explaining this interference, we consider the reflective electrodes within a region F of FIG. 14.

FIG. 15 is an enlarged view of the region F shown in FIG. 14.

In FIG. 15, eight projections p(81a) to p(88a) of the reflective electrodes are specifically illustrated. Each of eight projections p(81a) to p(88a) is formed on a respective one of eight associating projections 81a to 88a of the rectangular undulating portions 81 to 88 shown in FIG. 8. Further, eight reflected lights L81a to L88a are also illustrated, which are reflected from the eight projections p(81a) to p(88a) and then travel toward the viewer HE. The projections p(81a) to p(88a) of the reflective electrodes are periodically arranged in the x direction at the undulating portion pitch Tx'(=2Sx) and are arranged in the y direction at the undulating portion pitch Ty'(=Sy). Now, we will discuss the interference of lights reflected from two projections arranged in the x direction at the undulating portion pitch Tx'. For example, we discuss, in FIG. 15, the interference of the reflected lights L81a and L83a, the interference of the reflected lights L82a and L84a, the interference of the reflected lights L83a and L85a, the interference of the reflected lights L84a and L86a, the interference of the reflected lights L85a and L87a, and the interference of the reflected lights L86a and L88a. Since such projections as illustrated in FIG. 15 exist across the whole of the conventional substrate 100 (see FIG. 14), we will discuss such interferences of reflected lights across the whole of the conventional substrate 100. Such interferences of reflected lights across the whole of the conventional substrate 100 make the viewer HE recognize color profiles as described below.

FIG. 16 is a simulation result of the color profile recognized on the conventional substrate 100 by the viewer HE.

The color profile Cx recognized by the viewer HE comprises a pattern of vertical stripes in which strip-shaped colors Cm−p to Cm+p each extending in the y direction are arranged in the x direction. The viewer HE recognizes each of the colors Cm−p to Cm+p within a respective one of the strip-shaped regions Ym−p to Ym+p (shown in FIG. 14) extending in the y direction. For example, the viewer HE recognizes the color Cm within the region Ym and recognizes the color Cm+p within the region Ym+p. The color Cm is substantially white, and the colors at the same distance from the color Cm are the same color. For example, the color Cm−x is the same color as the color Cm+x and the color Cm−1 is the same color as the color Cm+1. Further, the other colors than the color Cm change with increasing distance from the color Cm in such a way that the longer wavelength colors to the shorter wavelength colors are repeated.

(2) The interference of lights reflected from the projections arranged in the y direction at a predetermined interval.

For the purpose of explaining this interference, we consider the reflective electrodes within the region F of FIG. 14 again.

FIG. 17 is an enlarged view of the region F shown in FIG. 14.

In FIG. 17, in addition to eight projections p(81a) to p(88a) of the reflective electrodes, eight projections p(81h) to p(88h) of the reflective electrodes are specifically illustrated. Each of eight projections p(81h) to p(88h) is formed on a respective one of eight associating projections 81h to 88h of the rectangular undulating portions 81 to 88 shown in FIG. 8. Further, in addition to eight reflected lights L81a to L88a, eight reflected lights L81h to L88h are also illustrated, which are reflected from the eight projections p(81h) to p(88h) and then travel toward the viewer HE. Like the projections p(81a) to p(88a) of the reflective electrodes, the projections p(81h) to p(88h) of the reflective electrodes are periodically arranged in the x direction at the undulating portion pitch Tx'(=2Sx) and in the y direction at the undulating portion pitch Ty'(=Sy). Each of the projections p(81h) to p(88h) of the reflective electrodes is positioned at a distance Dy from a respective one of the projections p(81a) to p(88a) in the y direction. Now we will discuss the interference of lights reflected from two projections arranged in the y direction at the distance Dy. For example, we discuss, in FIG. 17, the interference of the reflected lights L81a and L81h, the interference of the reflected lights L82a and L82h, the interference of the reflected lights L83a and L83h, . . . , and the interference of the reflected lights L87a and L87h. Since such projections as illustrated in FIG. 17 exist across the whole of the conventional substrate 100 (see FIG. 14), we will discuss such interferences of reflected lights across the whole of the conventional substrate 100. Such interferences of reflected lights across the whole of the conventional substrate 100 make the viewer HE recognize color profiles as described below.

FIG. 18 is a simulation result of the color profile recognized on the substrate by the viewer HE.

The viewer HE recognizes color profile Cy comprising a pattern of horizontal stripes in which strip-shaped colors Cm−q to Cm+q each extending in the x direction are arranged in the y direction. The viewer HE recognizes each of the colors Cm−q to Cm+q within a respective one of the strip-shaped regions Xm−q to Xm+q (shown in FIG. 14) extending in the x direction. For example, the viewer HE recognizes the color Cm within the region Xm and recognizes the color Cm+q within the region Xm+q. Like the color Cm shown in FIG. 16, the color Cm within the region Xm recognized by the viewer HE is substantially white. The colors at the same distance from the color Cm are the same color. For example, the color Cm−x is the same color as the color Cm+x and the color Cm−1 is the same color as the color Cm+1. Further, the other colors than the color Cm change with increasing distance from the color Cm in such a way that the longer wavelength colors to the shorter wavelength colors are repeated.

(3) The interference of lights reflected from the projections arranged in slanting direction with respect to the x and y directions at a predetermined interval.

For the purpose of explaining this interference, we consider the reflective electrodes within the region F of FIG. 14 again.

FIG. 19 is an enlarged view of the region F shown in FIG. 14.

In FIG. 19, in addition to eight projections p(81a) to p(88a) of the reflective electrodes, eight projections p(81i) to p(88i) of the reflective electrodes are illustrated. Each of eight projections p(81i) to p(88i) is formed on a respective one of eight associating projections 81i to 88i of the rectangular undulating portions 81 to 88 shown in FIG. 8. Further, in addition to eight reflected lights L81a to L88a, eight reflected lights L81i to L88i are also illustrated, which are reflected from the eight projections p(81i) to p(88i) and then travel toward the viewer HE. Like the projections p(81a) to p(88a) of the reflective electrodes, the projections p(81i) to p(88i) of the reflective electrodes are periodically arranged in the x direction at the undulating portion pitch Tx'(=2Sx) and in the y direction at the undulating portion pitch Ty'(=Sy). Each of the projections p(81i) to p(88i) is positioned at a distance Dxy from a respective one of the projections p(81a) to p(88a) in the dxy direction. The dxy direction is different form the x and y directions. Now, we will discuss the interference of lights reflected from two projections arranged in the dxy direction at the distance Dxy. For example, we discuss, in FIG. 19, the interference of the reflected lights L81a and L81i, the interference of the reflected lights L82a and L82i, the interference of the reflected lights L83a and L83i, . . . , the interference of the reflected lights L87a and L87i, and the interference of the reflected lights L88a and L88i. Since such projections as illustrated in FIG. 19 exist across the whole of the conventional substrate 100 (see FIG. 14), we will discuss such interferences of reflected lights across the whole of the conventional substrate 100. Such interferences of reflected lights across the whole of the conventional substrate 100 make the viewer HE recognize color profiles as described below.

FIG. 20 is a simulation result of the color profile recognized on the substrate by the viewer HE.

The viewer HE recognizes color profile Cxy comprising a pattern of slanting stripes in which strip-shaped colors Cm−r to Cm+r each extending in the dxy' direction perpendicular to the dxy direction are arranged in the dxy direction. The viewer HE recognizes each of the colors Cm−r to Cm+r within a respective one of the strip-shaped regions XYm−r to XYm+r (shown in FIG. 14) extending in the dxy' direction. For example, the viewer HE recognizes the color Cm within the region XYm and recognizes the color Cm+r within the regions XYm+r. Like the color Cm shown in FIGS. 16 and 18, the color Cm within the region XYm recognized by the viewer HE is substantially white. The colors at the same distance from the color Cm are the same color. For example, the color Cm−x is the same color as the color Cm+x and the color Cm−1 is the same color as the color Cm+1. Further, the other colors than the color Cm change with increasing distance from the color Cm in such a way that the longer wavelength colors to the shorter wavelength colors are repeated.

In the explanation described above, the color profiles Cx, Cy, and Cxy are independently shown, but in actuality the viewer HE recognizes the color profiles Cx, Cy, and Cxy with the profiles Cx, Cy, and Cxy superimposed. For this reason, we. discuss the superimposed color profiles Cx, Cy and Cxy.

FIG. 21 shows the superimposed color profiles Cx, Cy and Cxy.

In this Figure, the same colors Cm−x and Cm+x within the color profiles Cx, Cy, and Cxy are shown by hatching. Each of the color profiles Cx, Cy, and Cxy comprises the colors Cm−x and Cm+x, so that if the colors Cm−x and Cm+x of the color profiles Cx, Cy, and Cxy are superimposed, the color Cm−x (Cm+x) is enhanced at the superimposed portions. FIG. 21 shows a state in which only color profiles Cx, Cy and Cxy are superimposed, but the other color profiles than the color profiles Cx, Cy, and Cxy are also obtained because of the existence of the other projections than shown in FIGS. 15, 17 and 19. It is therefore considered that, if all color profiles obtained by the reflected lights coming from the projections are superimposed, the enhanced portions of the color Cm−x (Cm+x) appear across the whole of the conventional substrate 100 and the viewer HE recognizes the enhanced color Cm−x (Cm+x). Similarly, the viewer HE would recognize the other enhanced colors (for example, Cm+1 and Cm−1). It is therefore considered that the viewer HE recognizes the coloring when he views the conventional substrate 100.

The explanation described above is given to the color profiles which appear by the interferences of the reflected lights coming from the projections of the reflection electrodes, but the similar explanation is given to the color profiles which appear by the interferences of the reflected lights coming from the recesses of the reflection electrodes.

From the consideration described above, it is considered that the viewer HE recognizes the coloring due to the superimposition of the color profiles Cx, Cy, and Cxy having such patterns of stripes as shown in FIGS. 16, 18 and 20. Therefore, one of methods of eliminating or reducing the coloring might be to avoid the appearance of the color profiles having such patterns of stripes as shown in FIGS. 16, 18 and 20. So, we discuss FIGS. 14 to 20 again in order to consider the reason for the appearance of the color profiles Cx, Cy, and Cxy having such patterns of stripes as shown in FIGS. 16, 18 and 20.

The color profile Cx shown in FIG. 16 appears by the interferences of the reflected lights shown in FIG. 15. The color profile Cy shown in FIG. 18 appears by the interferences of the reflected lights shown in FIGS. 17. The color profile Cxy shown in FIG. 20 appears by the interferences of the reflected lights shown in FIG. 19. So, we discuss the interferences of the reflected lights shown in FIGS. 15, 17 and 19.

First, see FIG. 15. In FIG. 15, eight reflected lights L81a to L88a are illustrated in order that we may discuss the interference of the reflected lights coming from the projections arranged in the x direction at the undulating portion pitch Tx'. Now, we discuss four reflected lights L81a, L83a, L85a, and L87a of eight reflected lights L81a to L88a, which are arranged in the x direction. Four reflected lights L81a, L83a, L85a, and L87a differ from each other in their optical path length, and the optical path difference #Lx1 between the reflected lights 81a and 83a, the optical path difference #Lx2 between the reflected lights 83a and 85a, and the optical path difference #Lx3 between the reflected lights 85a and 87a are different from each other. The values of #Lx1, #Lx2 and #Lx3 become larger in this order. Therefore, there are variations in optical path difference, which optical path difference is a optical path difference between two reflected lights coming from a pair of two projections arranged in the x direction. This explanation described above is given to the optical path difference related to four reflected lights L81a, L83a, L85a, and L87a, but the similar explanation is given to the optical path difference related to remaining four reflected lights L82a, L84a, L86a, and L88a. However, it is noted that the optical path difference between the reflected lights coming from a pair of projections, which projections are arranged in the x direction, remains the same even if the pair of projections deviates in the y direction (perpendicular to the x direction). For example, in FIG. 15, since the pair of projections p(82a) and p(84a) exists in such a position to relatively differ in the y direction from the position of the pair of the projections p(81a) and p(83a), the optical path difference between the reflected lights L82a and L84a (#Lx1) is the same as the optical path difference between the reflected lights L81a and L83a (#Lx1). Similarly, the optical path difference between the reflected lights L84a and L86a (#Lx2) is the same as the optical path difference between the reflected lights L83a and L85a (#Lx2), and the optical path difference between the reflected lights L86a and L88a (#Lx3) is the same as the optical path difference between the reflected lights L85a and L87a (#Lx3). Therefore, it is noted that the optical path difference between the reflected lights remains the same even if the pair of projections deviates in the y direction. From the explanation described above, it is understood that the pairs of projections for causing the same optical path differences are arranged in the y direction and the pairs of projections for causing the different optical path differences are arranged in directions different from the y direction (e.g. the x direction). Since the colors caused by the interference lights depend on the optical path difference, the viewer HE recognizes the same color in the y direction because of the same optical path difference and recognizes the different colors in the directions different from the y direction (e.g. the x direction) because of the different optical path differences, so it is considered that the viewer HE recognizes the color profile Cx of the vertical stripes shown in FIG. 16. Further, it is noted that if a certain pair of projections and the other pair of projections exist in the different positions in the x direction, but exist within the same region of the regions Ym−p to Ym+p of the conventional substrate 100 (see FIG. 14) (for example, a certain pair of projections is the pair of projections p(81a) and p(83a), and the other pair of projections is the pair of projections p(83a) and p(85a) in FIG. 15), the optical path difference between the reflected lights coming from the certain pair of projections is only slightly different from the optical path difference between the reflected lights coming from the other pair of projections. If the optical path differences are only slightly different (e.g. #Lx1 and #Lx2), the resultant colors are resemble, so that the viewer HE generally can not recognize the difference of colors and thus recognizes the substantially same color. Therefore, it is noted that the viewer HE recognizes the width Wc (see FIG. 16) of each of the colors Cm−p to Cm+p as a wider width than distance 2Sx (two times the pixel pitch Sx) between two projections.

Next, see FIG. 17. In FIG. 17, eight reflected lights L81a to L88a and eight reflected lights L81h to L88h are illustrated in order that we may discuss the interference of the reflected lights coming from two projections arranged in the y direction at the distance Dy. Now, we discuss four reflected lights L81h, L81a, L82h and L82a arranged in the y direction. The optical path difference between the reflected lights 81a and 81h (#Ly1) is different from the optical path difference between the reflected lights 82a and 82h (#Ly2). Therefore, there are variations in optical path difference, which optical path difference is a optical path difference between reflected lights coming from projections arranged in the y direction. Optical path differences related to the other reflected lights arranged in the y direction can be explained similarly to the optical path differences related to four reflected lights L81h, L81a, L82h, and L82a. However, it is noted that the optical path difference between the reflected lights coming from a pair of projections, which projections are arranged in the y direction, remains the same even if the pair of projections deviates in the x direction (perpendicular to the y direction). For example, in FIG. 17, since the pair of projections p(83a) and p(83h) exists in such a position to relatively differ in the x direction from the position of the pair of the projections p(81a) and p(81h), the optical path difference between the reflected lights L83a and L83h (#Ly1) is the same as the optical path difference between the reflected lights L81a and L81h (#Ly1). Similarly, both the optical path difference between the reflected lights L85a and L85h and the optical path difference between the reflected lights L87a and L87h are the same as the optical path difference between the reflected lights L81a and L81h. On the other hand, since the pair of projections p(84a) and p(84h) exists in such a position to relatively differ in the x direction from the pair of the projections p(82a) and p(82h), the optical path difference between the reflected lights L84a and L84h (#Ly2) is the same as the optical path difference between the reflected lights L82a and L82h (#Ly2). Similarly, the optical path difference between the reflected lights L86a and L86h and the optical path difference between the reflected lights L88a and L88h are the same as the optical path difference between the reflected lights L82a and L82h. Therefore, it is noted that the optical path difference between the reflected lights remains the same even if a pair of projections deviates in the x direction. From the explanation described above, it is understood that the pairs of projections for causing the same optical path differences are arranged in the x direction and the pairs of projections for causing different optical path differences are arranged in directions different from the x direction (e.g. the y direction). Since the colors caused by the interference lights depend on the optical path difference, the viewer HE recognizes the same color in the x direction because of the same optical path difference and recognizes the different colors in the directions different from the x direction (e.g. the y direction) because of the different optical path differences, so it is considered that the viewer HE recognizes the color profile Cy having the horizontal stripes shown in FIG. 18. Further, it is noted that if a certain pair of projections and the other pair of projections exist in the different positions in the y direction, but exist within the same region of the regions Xm−q to Xm+q of the conventional substrate 100 (see FIG. 14) (for example, a certain pair of projections is the pair of projections p(81a) and p(81h), and the other pair of projections is the pair of projections p(82a) and p(82h) in FIG. 17), the optical path difference between the reflected lights coming from the certain pair of projections is only slightly different from the optical path difference between the reflected lights coming from the other pair of projections. If the optical path differences are only slightly different (e.g. #Ly1 and #Ly2), the resultant colors are resemble, so that the viewer HE generally can not recognize the difference in color and thus recognizes the substantially same color. Therefore, it is noted that the viewer HE recognizes the width Wc (see FIG. 18) of each of the colors Cm−q to Cm+q as the wider width than distance Dy between two projections.

Next, see FIG. 19. In FIG. 19, eight reflected lights L81a to L88a and eight reflected lights L81i to L88i are illustrated in order that we may discuss the interference of the reflected lights coming from projections arranged in the dxy direction at the distance Dxy. Now, we discuss the reflected lights L81a and L81i and the reflected lights L83a, and L83i. The optical path difference #Lxy1 between the reflected lights 81a and 81i is different from the optical path difference #Lxy2 between the reflected lights 83a and 83i. However, it is noted that the optical path difference between the reflected lights from a pair of projections, which projections are arranged in the dxy direction, remains the same even if the pair of projections deviates in the dxy' direction (perpendicular to the dxy direction). For example, in FIG. 19, since the pair of projections p(86a) and p(86i) exists in such a position to relatively differ in the dxy' direction from the position of the pair of the projections p(81a) and p(81i), the optical path difference between the reflected lights L86a and L86i (#Lxy1) is the same as the optical path difference between the reflected lights L81a and L81i (#Lxy1). Similarly, since the pair of projections p(88a) and p(88i) exists in such a position to relatively differ in the dxy' direction from the position of the pair of the projections p(83a) and p(83i), the optical path difference between the reflected lights L88a and L88i (#Lxy2) is the same as the optical path difference between the reflected lights L83a and L83i (#Lxy2). Therefore, it is noted that the optical path difference between the reflected lights remains the same even if the pair of projections deviates in the dxy' direction. From the explanation described above, it is understood that the pairs of projections for causing the same optical path difference are arranged in the dxy' direction and the pairs of projections for causing different optical path differences are arranged in directions different from the dxy' direction (e.g. the dxy direction). Since the colors caused by the interference lights depend on the optical path difference, the viewer HE recognizes the same color in the dxy' direction because of the same optical path difference and recognizes the different colors in the directions different from the dxy' direction (e.g. the dxy direction) because of the different optical path differences, so it is considered that the viewer HE recognizes the color profile Cxy having the slanting stripes shown in FIG. 20. Further, it is noted that if a certain pair of projections and the other pair of projections exist in the different positions in the dxy direction, but exist within the same region of the regions XYm−r to XYm+r of the conventional substrate 100 (see FIG. 14) (for example, a certain pair of projections is the pair of projections p(82*a*) and p(82*i*), and the other pair of projections is the pair of projections p(83*a*) and p(83*i*) in FIG. 19), the optical path difference between the reflected lights coming from the certain pair of projections is only slightly different from the optical path difference between the reflected lights coming from the other pair of projections. If the optical path differences are only slightly different (e.g. #Lxy1 and #Lxy2), the resultant colors are resemble, so that the viewer HE generally can not recognize the difference in color and thus recognizes the substantially same color. Therefore, it is noted that the viewer HE recognizes the widths Wc (see FIG. 20) of each of the colors Cm−r to Cm+r as the wider width than the distance Dxy between two projections.

From the consideration described above, it is considered that the cause of appearing each of the color profiles Cx, Cy and Cxy having streaks as shown in FIGS. 16, 18 and 20 is the pairs of two projections repeatedly existing in each of regions of the conventional substrate 100, which two projections are arranged in a predetermined direction. Therefore, the coloring might be eliminated or reduced if such pairs of projections don't exist repeatedly. In order for such pairs of projections not to repeatedly exist, a method of designing patterns of projections and recesses of the reflective electrodes so as to be different from each other might be usable. This method can prevent such pairs of two projections from repeatedly existing since the reflective electrodes differ in their pattern of projections and recesses, so that no coloring as shown in FIG. 21 would occur. However, this method is required to design different patterns of projections and recesses of the reflective electrodes so as to be different from each other, so that the design of the patterns of projections and recesses of the reflective electrodes becomes difficult with increasing number of the reflective electrodes. In the case of e.g. a mobile phone of QVGA type, 240×3×320 reflective electrodes are provided. This means that different patterns of projections and recesses must be designed for such great number of the reflective electrodes, so that this method is not an actually usable method.

So, in order to easily eliminate or reduce the coloring without designing of the great number of patterns of projections and recesses, the inventor has reached the formation of the organic film 8 in a manner described with respect to FIG. 5. The reason why the coloring can be eliminate or reduced by forming the organic film 8 shown in FIG. 5 is described below.

In FIG. 5, the associating projections 18*a* to 128*a* of twelve undulating portions 18 to 128 of the organic film 8 are illustrated. Since each undulating portion shown in FIG. 5 comprises the basic pattern of projections and recesses shown in FIG. 6, the patterns of projections and recesses of the undulating portions are the same within the xy surface expect for the presence or absence of the contact hole CH. However, since the relationship between the undulating portion Tx and the pixel pitch Sx, and the relationship between the undulating portion Ty and the pixel pitch Sy are both non-integral multiple, it is noted that even the associating projections differ in their position within sub pixel region. For example, the projection 28*a* within the sub pixel region Ar1 is positioned at the left corner within the sub pixel region Ar1, but the projection 88*a* within the sub pixel region Ag3 is positioned at the right corner within the sub pixel region Ag3. As described above, even the associating projections differ in their position within sub pixel region and thus differ in their height in the z direction as shown in FIG. 22.

FIG. 22 is a schematic cross-sectional view of six associating projections 28*a*, 38*a*, 58*a*, 68*a*, 88*a*, and 98*a* of the six undulating portions 28, 38, 58, 68, 88 and 98 of FIG. 5, viewed in the y direction.

The six projections 28*a*, 38*a*, 58*a*, 68*a*, 88*a*, and 98*a* are the associating projections, but vary in their height in the z direction as shown in FIG. 22. As a result, there are variations in height difference, which height difference is a difference in height between two projections adjacent in the x direction to each other. For example, a height difference #H1 between the projections 28*a* and 58*a* is smaller than a height difference #H3 between the projections 58*a* and 88*a*, and a height difference #H2 between the projections 38*a* and 68*a* is smaller than the height difference #H4 between the projections 68*a* and 98*a*. FIG. 22 shows only six associating projections, but the associating projections varying in their height in the z direction exist across the whole of the reflective electrode substrate 1 (see FIG. 1). This is contrasted with the conventional substrate 100 in which the associating projections are the same height in the z direction (see FIG. 11). In the first embodiment, an attention is paid to a point where even the associating projections 28*a*, 38*a*, 58*a*, 68*a*, 88*a*, and 98*a* vary in their height as shown in FIG. 22. After forming the organic film 8 in which the associating projections vary in their height, the reflective electrodes (see FIG. 2) are formed on the organic film 8 and thus the reflective electrode substrate 1 is manufactured. The interference of the reflected lights coming from the reflective electrode substrate 1 is discussed below.

FIG. 23 is an enlarged view of the region F shown in FIG. 1.

In FIG. 23, six projections p(28*a*), p(38*a*), p(58*a*), p(68*a*), p(88*a*) and p(98*a*) of the reflective electrodes are specifically illustrated. Each of six projections p(28*a*), p(38*a*), p(58*a*), p(68*a*), p(88*a*) and p(98*a*) is formed on a respective one of the six associating projections 28*a*, 38*a*, 58*a*, 68*a*, 88*a*, and 98*a* of the undulating portions shown in FIG. 22.

FIG. 24 is a schematic cross-sectional view of six projections p(28*a*) to p(98*a*) shown in FIG. 23, viewed in the y direction.

Since the associating projections of the rectangular undulating portions vary in their height as described with reference to FIG. 22, the projections p(28*a*) to p(98*a*) of the reflective electrodes vary in their height in the z direction accordingly. As a result, there are variations in height difference, which height difference is a difference in height between two projections adjacent in the x direction to each other. For example, a height difference #H1 between the projections p(28*a*) and p(58*a*) is smaller than a height difference #H3 between the projections p(58*a*) and p(88*a*), and a height difference #H2 between the projections p(38*a*) and p(68*a*) is smaller than the height difference #H4 between the projections p(68a) and p(98a). Therefore, if the pairs of projections differ in their position in the x direction, the height differences vary accordingly. Now, it is also noted that such variations in height difference occur if the pairs of projections differ in their position in the y direction. For example, a height difference #H1 between the projections p(28a) and p(58a) is smaller than a height difference #H2 between the projections p(38a) and p(68a), and a height difference #H3 between the projections p(58a) and p(88a) is smaller than a height difference #H4 between the projections p(68a) and p(98a). Such variations in height difference occur across the whole of the substrate. Such variations in height difference cause the variations in optical path difference. For example, the optical path difference #Lx1 between the reflected lights L28a and L58a is different from the optical path difference #Lx2 between the reflected lights L38a and L68a, and the optical path difference #Lx3 between the reflected lights 58a and 88a is different from the optical path difference #Lx4 between the reflected lights L68a and L98a. Therefore, in FIG. 23, no pairs of projections causing the same optical path difference appears in the y direction differently to FIG. 15, so no vertical stripes as shown in FIG. 16 can appear. In the case of FIG. 23, the viewer HE recognizes, on the substrate, colors described below.

FIG. 25 is a conceptual illustration of the colors recognized on the reflective electrode substrate 1 by the viewer HE.

In FIG. 25, the colors appearing within the region F of the reflective electrode substrate 1 are enlarged. As shown in this enlarged view, various colors C1, C2, . . . , Cz depending on the optical path differences appear in a grid pattern within sub regions of the region F defined by the undulating portion pitches Tx and Ty. Now, it is noted that, as described with respect to FIG. 24, the variations in height difference cause the variations in optical path difference. As a result, various colors appear within the region F scatteringly. Therefore, unlike FIG. 16, FIG. 25 illustrates that various colors appear within sub regions defined by the undulating portion pitches Tx and Ty and thus no same color appear in the predetermined direction. When various colors appear within such small sub regions scatteringly, the viewer HE can not recognize the differences in color and thus recognizes such various colors within region F as the mixed color. Such various colors appear scatteringly within the other region than the region F, and thus the viewer HE recognizes various colors within the other region than the region F as the mixed color. It is therefore considered that the viewer HE dose not recognize the coloring across the whole of the reflective electrode substrate 1, or the viewer HE recognizes the reduced coloring across the whole of the reflective electrode substrate 1.

Although FIGS. 23 to 25 explain the interference of the reflected lights caused by the periodically existing pairs of two projections (this two projections are arranged in the x direction), the similar explanation would be given to the interference of the reflected lights caused by the periodically existing pairs of two projections (this two projections are arranged in the other direction), so it is considered that various colors are arranged in a grid pattern as shown in FIG. 25 and thus the coloring is eliminated or reduced. Therefore, it is considered that the coloring recognized by the viewer HE is eliminated or reduced across the whole of the substrate.

The undulating portion pitch Tx is larger than the pixel pitch Sx in the first embodiment, but the pixel pitch Sx may be larger than the undulating portion pitch Tx oppositely. In this case, the coloring can be likewise eliminated or reduced by defining the undulating portion pitch Tx in such a way that the pixel pitch Sx becomes an non-integral multiple of the undulating portion pitch Tx. Further, the undulating portion pitch Ty is smaller than the pixel pitch Sy in the first embodiment, but the undulating portion pitch Ty may be larger than the pixel pitch Sy. In this case, the coloring can be likewise eliminated or reduced by defining the undulating portion pitch Ty so as to be an non-integral multiple of the pixel pitch Sy.

In the first embodiment, since the undulating portion pitch Tx is defined as seventeen eighths ($17/8$) times the pixel pitch Sx, the associating projections arranged in the x direction of the undulating portions have the same height at intervals of 17Sx (seventeen times the pixel pitch Sx). Therefore, the projections having the same height are arranged at intervals of 17Sx (seventeen times the pixel pitch Sx) in the x direction in the first embodiment. From the viewpoint of reducing the coloring more effectively, it is preferable that the distance between the projections having the same height is large to some extent, for example approximately 1 mm. The value of Sx can be, for example 80 mm and thus 17Sx is equal to 1.36 mm (17Sx=1.36 mm). In this case, intervals at which the projections having the same height are arranged in the x direction are 1.36 mm, this has a sufficient effect on the reduction of the coloring. On the other hand, since the undulating portion pitch Ty is defined as nineteen twenty-fourths ($19/24$) times the pixel pitch Sy, the associating projections arranged in the y direction have the same height at intervals of 19Sy (nineteen times the pixel pitch Sy). Therefore, the projections having the same height are arranged at intervals of 19Sy (nineteen times the pixel pitch Sy) in the y direction in the first embodiment. The value of Sy can be, for example 240 mm and thus 19Sy is equal to 4.56 mm (19Sy=4.56 mm). In this case, intervals at which the projections having the same height are arranged in the y direction are 4.56 mm, this has a sufficient effect on the reduction of the coloring. It is noted that intervals at which the projections having the same height are arranged may be smaller than 1 mm if the coloring can be eliminated or reduced.

In the first embodiment, in order to eliminate or reduce the coloring, we pay attention to the x and y directions in which the sub pixel regions are arranged and then we form the organic film 8 which has the undulating portions arranged in this x directions at the undulating portion pitch Tx and arranged in this y direction at the undulating portion pitch Ty. On the other hand, since the sub pixel regions are also arranged in the other direction than the x and y directions (for example, in a direction in which the sub pixel regions Ar2 and Ab1 are arranged, or in a direction in which the sub pixel regions Ar2 and Ab3 are arranged), so we may pay attention to this other direction and then we may form an organic film which has the undulating portions arranged in this other direction at the predetermined undulating portion pitch. However, for reducing the coloring more effectively, the organic film 8 is preferably formed which having the undulating portions arranged in the x direction at the undulating portion pitch Tx and arranged in the y direction at the undulating portion pitch Ty.

In the first embodiment, the relationship between the undulating portion pitch Tx and the pixel pitch Sx, and the relationship between the undulating portion pitch Ty and the pixel pitch Sy are both non-integral multiple, but the coloring can be reduced even if only one of this two relationships is non-integral multiple. A second embodiment in which only the relationship between the undulating portion pitch Tx and the pixel pitch Sx is non-integral multiple is described below.

FIG. 26 is a plan view of a reflective electrode substrate of the second embodiment in which only the relationship between the undulating portion pitch Tx and the pixel pitch Sx is non-integral multiple.

The reflective electrode substrate comprises an organic film 8 having rectangular undulating portions 18 to 88. On the organic film 8, reflective electrodes Er1, Eg1, Eb1 . . . are formed. In FIG. 26, six projections p(18a) to p(68a) and six projections p(18c) to p(68c) of the reflective electrodes are specifically illustrated. Each of six projections p(18a) to p(68a) is formed on a respective one of six associating projections 18a to 68a of six rectangular undulating portions 18 to 68. Each of remaining six projections p(18c) to p(68c) is formed on a respective one of six associating projections 18c to 68c of six rectangular undulating portions 18 to 68.

FIG. 27 is a schematic cross-sectional view of the projections p(18a), p(38a) and p(58a) arranged in the x direction shown in FIG. 26, viewed in the y direction.

Since the relationship between the undulating portion pitch Tx and the pixel pitch Sx is non-integral multiple, there are similar variations in height differences as shown in FIG. 24 if the pairs of two projections differ in their position in the x direction. For example, a height difference #H1 between the projections p(18a) and p(38a) is larger than a height difference #H2 between the projections p(38a) and p(58a). However, unlike FIG. 23, FIG. 26 illustrates that the undulating portion pitch Ty is the same as the pixel pitch Sy, so it is noted that a height difference remains the same even if the pair of two projections deviates in the y direction. For example, the pair of projections p(28a) and p(48a) exists in such a position to relatively differ in the y direction from the position of the pair of the projections p(18a) and p(38a), so that a height difference between the projections p(28a) and p(48a) is also #H1. Therefore, a height difference remains the same even if the pair of projections deviates in the y direction. It is therefore considered that if we pay attention to the projections arranged in the x direction at the undulating portion pitch Tx, the interferences of the reflected lights coming from such projections result in the vertical stripes as shown in FIG. 16 (That is, the colors can not be scatteringly arranged in contrast to FIG. 25). However, since the relation between the undulating portion pitch Tx and the pixel pitch Sx is non-integral multiple in FIG. 26, there can be variations in height difference, which height difference is a difference in height between two projections arranged in the other directions than the y direction. In order to explain this, we pay attention to the pair of two projections p(18a) and p(18c) and the pair of two projections p(48a) and p(48c), which two projections are arranged in the dxy direction different from the y direction.

FIG. 28 is a schematic cross-sectional view of the pair of the projections p(18a) and p(18c) and the pair of the projections p(48a) and p(48c) shown in FIG. 26, viewed in the dxy' direction.

A height difference #H1 between the projections p(18a) and p(18c) arranged in the dxy direction is smaller than a height difference #H2 between the projections p(48a) and p(48c) arranged in the dxy direction. Therefore, if we pay attention to the projections arranged in the dxy direction, the interferences of the reflected lights coming from such projections result in scatteringly arranged colors as shown in FIG. 25. It is thus possible to reduce the coloring even if only the relation between the undulating portion pitch Tx and the pixel pitch Sx is non-integral multiple, compared with the prior art.

The first and second embodiments show the methods of eliminating or reducing the coloring by arranging the undulating portions , in a direction in which the sub pixel regions are periodically arranged, in such a way that the relation between the pixel pitch and the undulating potion pitch becomes the non-integral multiple, but a different method also can eliminate or reduce the coloring. The different method is described below.

FIG. 29 is a plan view of a part of a reflective electrode substrate 1 of the third embodiment, which can eliminate or reduce the coloring by the different method from the first and second embodiments.

Since the sub pixel regions are two-dimensionally arranged within the xy surface, the sub pixel regions are arranged not only in the x and y directions but also e.g. in d1 to d7 directions, so that the sub pixel regions are arranged in a large number of directions. In the third embodiment, we pay attention to two directions of such large number of directions; one is the x direction in which the sub pixel regions are arranged at the smallest pitch Sx and the other is the y direction in which the sub pixel regions are arranged at the smallest pitch Sy next to the pitch Sx. Like the sub pixel regions, the undulating portions 18 to 128 are arranged in a large number of directions, we pay attention to two directions of the large number of the directions for the undulating portions 18 to 128; one is a x' direction in which the undulating potions 18 to 128 are arranged at the smallest pitch Tx and the other is a y' direction in which portions 18 to 128 are arranged at the smallest pitch Ty next to the pitch Tx. In the third embodiment, the organic film 8 is formed in such a way that the mentioned two directions for the undulating portions 18 to 128 (x' and y' directions) are different from the mentioned two directions for the sub pixel regions (the x and y directions). Such organic film 8 also makes the associating projections of undulating portions 18 to 128 vary in their height, so that the coloring can be eliminated or reduced. In the third embodiment, the associating projections of the undulating portions 18 to 128 vary in their height even if the undulating portion pitch Tx is the same as the pixel pitch Sx and the undulating portion pitch Ty is the same as the pixel pitch Sy. Therefore, in FIG. 29, the coloring can be eliminated or reduced without considering whether the relation between the undulating portion pitch and the pixel pitch is an integral multiple or a non-integral multiple. In the third embodiment, the direction in which the undulating portions are arranged is different from the direction in which the pixels are arranged, and such different directions make it possible to reduce moire.

Further, in FIG. 29, the organic film 8 is formed in such a way that both of the directions x' and y' in which undulating portions are arranged are different from both x and y directions in which the sub pixel regions are arranged. However, it is possible to reduce the coloring even if the organic film 8 is formed in such a way that only one of the directions x' and y' is different from both x and y directions. Further, FIG. 29 illustrates an example in which the undulating portion pitch Tx' is the smallest and the undulating portion pitch Ty' is the smallest next to the pitch Tx', but the undulating portion pitches Tx' and Ty' may be equal. In this case, it is possible to reduce the coloring if both or one of directions x' and y' in which undulating portions are arranged at the equal pitches Tx' and Ty' is different from both x and y directions. Further, the pixel pitch Sx is smaller than Sy in FIG. 29, but may be equal to Sy. In this case, it is possible to reduce the coloring if both or one of directions x' and y' is different from both x and y directions in which the sub pixel regions are arranged at the equal pitches Sx and Sy.

Furthermore, comparing an image display device using the reflective electrode substrate of the first, second or third embodiment and an image display device using the conventional substrate 100, the former has the higher utilization efficiency of the reflected light coming from the substrate. The reason is described below.

The pattern of projections and recesses of the organic film 80 of the conventional substrate 100 is designed in the order given in the following way. First, the pattern of projections and recesses of the rectangular undulating portion shown in FIG. 9 is designed for every pair of two adjacent sub pixel regions, and next, the patterns of projections and recesses of the first and second rectilinear undulating portions 91 and 92 (see FIG. 8) are designed so as to fill gaps between the rectangular undulating portions adjacent to each other. If the organic film 80 is formed on the basis of such designs, the first and second rectilinear undulating portions 91 and 92 differ from the rectangular undulating portions in their shape of the cross section (see FIG. 30).

FIG. 30 shows a profile schematically representing the shape of the cross section of the first and second rectilinear undulating portions 91 and 92 (see FIG. 8) of the conventional substrate 100 and a profile schematically representing the shape of the cross section of the rectangular undulating portions of the conventional substrate 100.

In FIG. 30, a solid line indicates the profile schematically representing the shape of the cross section of the first and second rectilinear undulating portions 91 and 92 (see FIG. 8), a dashed line indicates the profile schematically representing the shape of the cross section of the rectangular undulating portions. In the profile of the rectangular undulating portion, the similar undulations appear repeatedly as indicated by the dash line, but in the profile of the first and second rectilinear undulating portions, gentle and steep undulations appear in mixed state. Such mixed gentle and steep undulations cause the image display device with the lower utilization efficiency of the light.

On the other hand, in the case of the reflective electrode substrates of the first to third embodiments, the pattern of projections and recesses of the organic film 8 is designed by designing the pattern of projections and recesses shown in FIG. 6 independently of the sub pixel regions and then closely tiling the designed pattern. Therefore, such mixed gentle and steep undulations shown in FIG. 30 by the solid line can be prevented from appearing, so that the image display device using the reflective electrode substrate 1 has the advantage of the higher utilization efficiency of light.

Furthermore, comparing an image display device using the reflective electrode substrate of the first, second or third embodiment and an image display device using the conventional substrate 100, the former has the higher contrast. The reason is described below.

In the case of the image display device using the conventional substrate 100, a diffusing film having the function of diffusing lights is provided on the conventional substrate 100 in order to prevent the coloring from occurring. However, the diffusing film causes the reduction of the contrast.

On the other hand, in the case of the reflective electrode substrates of the first to third embodiments, the coloring is eliminated or reduced by adjusting the undulating portion pitch of the organic film 8 or the arranging direction of the undulating portions. Therefore, if the coloring is completely eliminated in the invention, it is not necessary to provide the diffusing film on the reflective electrode substrate 1, so that the contrast is prevented from lowering. On the other hand, if the coloring is not completely eliminated and is slightly recognized in the invention, the diffusing film is required when you want to completely eliminate the coloring. However, since the colorings on the reflective electrode substrates 1 of the first to third embodiments are reduced to a certain extent without the diffusing film, the first to third embodiments can use the diffusing film having the lower diffusing performance than the diffusing film required for the conventional substrate 100. Therefore, the image display devices using the reflective electrode substrates 1 of the first to third embodiments can realize a smaller decrease of the contrast than the image display device using the conventional substrate.

The undulating portions of the organic film 8 in the first to third embodiments are continuous, but the undulating portions may be separated from each other.

The sub pixels are arranged in a stripe arrangement in the first to third embodiments, but in the present invention the sub pixels may be arranged in the other arrangement than the stripe arrangement (e.g. delta arrangement). In this other arrangement, the coloring can be eliminated or reduced when the relation between the undulating portion pitch and the pixel pitch is non-integral multiple or the direction in which the undulating portions are arranged is different from the direction in which the sub pixels (reflective electrodes) are arranged.

The first to third embodiments describe the examples in which one pixel is composed of three sub pixels, but the invention may be applied to an example in which one pixel is composed of e.g. four sub pixels. In this case, the coloring can be eliminated or reduced when the relation between the undulating portion pitch and the pixel pitch is non-integral multiple or the direction in which the undulating portions are arranged is different from the direction in which the sub pixels (reflective electrodes) are arranged.

Further, the first to third embodiments describe the reflective electrode substrates which are used for displaying color images, but the present invention can be applied to a reflective electrode substrate for displaying monochrome images. In the case of the reflective electrode substrate for displaying the monochrome images, one reflective electrode is formed on one pixel, but the coloring can be eliminated or reduced when the relation between the undulating portion pitch and the pixel pitch is non-integral multiple or the direction in which the undulating portions are arranged is different from the direction in which the sub pixels (reflective electrodes) are arranged.

In the first to third embodiments, any undulating portions have the pattern of projections and recesses shown in FIG. 6 (except for the presence or absence of the contact hole CH). Therefore, it is not necessary to design different patterns of projections and recesses of undulating portions across the whole of the reflective electrode substrate 1, so this has an advantage of an easy design of the pattern of projections and recesses of the undulating portions.

Further, in the reflective electrode substrates 1 of the first to third embodiments, each sub pixel has only a reflective function for reflecting light and has no transmit function for transmitting light, but the present invention can be also applied in the case that each sub pixel has both the reflective function and the transmit function.

INDUSTRIAL APPLICABILITY

The first to third embodiments according to the present invention are applied to examples in which the reflective electrodes are separated from each other every sub pixel region, but it is possible that the present invention is applied to an example in which line-shaped reflective electrodes extending e.g. in the x direction are provided.

The invention claim is:

1. A reflective structure comprising:
   a base, and;
   a reflective means formed on said base, wherein said base comprises:
   a supporting member provided with a first fundamental surface having portions differing in their height and a second fundamental surface having portions differing in their height;
   a first undulating portion, formed on said supporting member, having a first recess or projection, and;
   a second undulating portion, formed on said supporting member, having a second recess or projection associated with said first recess or projection, wherein said first and second fundamental surfaces are arranged in a first direction at a first fundamental surface pitch,
   wherein said first and second undulating portions are arranged in said first direction at a first undulating portion pitch, and wherein a larger pitch of said first undulating portion pitch and said first fundamental surface pitch is a non-integral multiple of a smaller pitch of said first undulating portion pitch and said first fundamental surface pitch,
   wherein said supporting member is provided with a third fundamental surface having portions differing in their height, wherein said base comprises a third undulating portion, formed on said supporting member, having a third recess or projection associated with said first recess or projection, wherein said first and third fundamental surfaces are arranged in a second direction at a second fundamental surface pitch. wherein said first and third undulating portions are arranged in said second direction at a second undulating portion pitch, and wherein a larger pitch of said second undulating portion pitch and said second fundamental surface pitch is a non-integral multiple of a smaller pitch of said second undulating portion pitch and said second fundamental surface pitch.

2. A reflective structure as claimed in claim 1, wherein said first undulating portion is continuous with said second undulating portion.

3. A reflective structure as claimed in claim 1, wherein said first fundamental surface pitch is equal to a first pixel pitch.

4. A reflective structure as claimed in claim 3, wherein said reflective means comprises first and second reflectors, said first and second reflectors arranged in said first direction at said first pixel pitch.

5. A reflective structure as claimed in claim 4, wherein said supporting member comprises: a first conductive line; a second conductive line; a first driving element for supplying said first reflector with data from said first conductive line, and; a second driving element for supplying said second reflector with data from said second conductive line, wherein said first and second conductive lines are arranged in said first direction at said first pixel pitch, and wherein said first and second driving elements are arranged in said first direction at said first pixel pitch.

6. A reflective structure as claimed in claim 1, wherein said first undulating portion is continuous with said third undulating portion.

7. A reflective structure as claimed in claim 1, wherein said second fundamental surface pitch is equal to a second pixel pitch.

8. A reflective structure as claimed in claim 7, wherein said supporting member comprises: a third conductive line, a fourth conductive line, and; a third driving element controlled through said third conductive line, wherein said first driving element is controlled through said fourth conductive line, wherein said third and fourth conductive lines are arranged in said second direction at said second pixel pitch, and wherein said first and third driving elements are arranged in said second direction at said second pixel pitch.

9. A reflective structure as claimed in claim 8, wherein said reflective means comprises a third reflector corresponding to said third driving element, said first and third reflectors arranged in said second direction at said second pixel pitch.

10. A reflective structure as claimed in claim 1, wherein said first and second directions are row and column directions, respectively.

11. A reflective structure as claimed in claim 1, wherein said reflective means comprises a reflective line extending in said first direction.

12. An image display device comprising said reflective structure described in claim 1.

13. A reflective structure comprising:
    a base, and;
    a reflective means formed on said base,
    wherein said base comprises:
    a supporting member provided with a first fundamental surface having portions differing in their height, a second fundamental surface having portions differing in their height, a third fundamental surface having portions differing in their height;
    a first undulating portion formed on said supporting member,
    a second undulating portion formed on said supporting member, and;
    a third undulating portion formed on said supporting member,
    wherein said first and second fundamental surfaces are arranged in a first fundamental surface direction at a first fundamental surface pitch of a plurality of fundamental surface pitch, said first fundamental surface pitch being the smallest of said plurality of fundamental surface pitches,
    wherein said first and third fundamental surfaces are arranged in a second fundamental surface direction at a second fundamental surface pitch of said plurality of fundamental surface pitch, said second fundamental surface pitch being equal to said first fundamental surface pitch or being the smallest next to said first fundamental surface pitch,
    wherein said first and second undulating portions are arranged in a first undulating portion direction at a first undulating portion pitch of a plurality of undulating portion pitch, said first undulating portion pitch being the smallest of said plurality of undulating portion pitch,
    wherein said first and third undulating portions are arranged in a second undulating portion direction at a second undulating portion pitch of said plurality of undulating portion pitch, said second undulating portion pitch being equal to said first undulating portion pitch or the smallest next to said first undulating portion pitch,
    and wherein at least one of said first and second undulating portion directions are different from said first and second fundamental surface directions.

14. A reflective structure as claimed in claim 13, wherein said first to third undulating portion are continuous.

15. A reflective structure as claimed in claim 13, wherein said first fundamental surface pitch is equal to a first pixel pitch.

16. A reflective structure as claimed in claim 15, wherein said reflective means comprises first and second reflectors, said first and second reflectors arranged in said first fundamental surface direction at said first pixel pitch.

17. A reflective structure as claimed in claim 16, wherein said supporting member comprises: a first conductive line; a second conductive line; a first driving element for supplying said first reflector with data from said first conductive line, and; a second driving element for supplying said second reflector with data from said second conductive line, wherein said first and second conductive lines are arranged in said first fundamental direction at said first pixel pitch, and wherein said first and second driving elements are arranged in said first fundamental direction at said first pixel pitch.

18. A reflective structure as claimed in claim 17, wherein said supporting member comprises: a third conductive line, a fourth conductive line, and; a third driving element controlled through said third conductive line, wherein said first driving element is controlled through said fourth conductive line, wherein said third and fourth conductive lines are arranged in said second direction at said second pixel pitch, and wherein said first and third driving elements are arranged in said second direction at said second pixel pitch.

19. A reflective structure as claimed in claim 18, wherein said reflective means comprises, a third reflector corresponding to said third driving element, said first and third reflectors arranged in said second direction at said second pixel pitch.

20. A reflective structure as claimed in claim 13, wherein said reflective means comprises a reflective line extending in said first fundamental surface direction.

* * * * *